US008293133B2

(12) United States Patent
Jacobson et al.

(10) Patent No.: US 8,293,133 B2
(45) Date of Patent: Oct. 23, 2012

(54) POROUS SOLIDS, SELECTIVE SEPARATIONS, REMOVAL OF SULFUR COMPOUNDS, ADSORPTION

(75) Inventors: Allan J. Jacobson, Houston, TX (US); Xiqu Wang, Pearland, TX (US); Lumei Liu, Houston, TX (US)

(73) Assignee: The University of Houston System, Houston, TX (US)

(*) Notice: Subject to any disclaimer, the term of this patent is extended or adjusted under 35 U.S.C. 154(b) by 716 days.

(21) Appl. No.: 12/376,804

(22) PCT Filed: Aug. 9, 2007

(86) PCT No.: PCT/US2007/017729
§ 371 (c)(1),
(2), (4) Date: Feb. 9, 2009

(87) PCT Pub. No.: WO2008/021194
PCT Pub. Date: Feb. 21, 2008

(65) Prior Publication Data
US 2010/0176031 A1    Jul. 15, 2010

Related U.S. Application Data

(60) Provisional application No. 60/836,806, filed on Aug. 10, 2006.

(51) Int. Cl.
| | |
|---|---|
| *C09K 3/00* | (2006.01) |
| *B01D 39/00* | (2006.01) |
| *C07F 7/00* | (2006.01) |
| *C07F 9/00* | (2006.01) |
| *C07F 11/00* | (2006.01) |
| *C07F 15/00* | (2006.01) |
| *C07F 5/06* | (2006.01) |

(52) U.S. Cl. ........ 252/184; 95/135; 210/502.1; 210/660; 534/16; 556/42; 556/51; 556/61; 556/147; 556/184

(58) Field of Classification Search ............... 556/42, 556/51, 61, 147, 184; 534/16; 252/184; 210/502.1, 660; 95/135
See application file for complete search history.

(56) References Cited

FOREIGN PATENT DOCUMENTS
| | | |
|---|---|---|
| JP | 10 099680 A | 4/1998 |
| WO | 2005063354 A | 7/2005 |
| WO | 2007054581 A | 5/2007 |

OTHER PUBLICATIONS

Bourrelly S et al: "Different Adsorption Behaviors of Methane and Carbon Dioxide in the Isotypic Nanoporous Metal Terephthalates MIL-53 and MIL-47" Journal of the American Chemical Society, American Chemical Society, Washington, DC, US, vol. 127, 2005, pp. 13519-13521.*
Barthelet et al., Angew. Chem, Int, Ed., vol. 41, No. 2, pp. 281-284 (2002).*

(Continued)

*Primary Examiner* — Porfirio Nazario Gonzalez
(74) *Attorney, Agent, or Firm* — Robert W Strozier

(57) ABSTRACT

Crystals of $[VOBDC](H_2BDC)_{0.71}$ were synthesized hydrothemally. The guest acid molecules were removed by heating in air to give high quality single crystals of VOBDC. VOBDC was observed to show crystal-to-crystal transformations on absorption of the guest molecules aniline, thiophene and acetone from the liquid phase. Accurate structural data of the guest molecules and framework deformations were obtained from single crystal X-ray data. VOBDC was also shown to absorb selectively thiophene and dimethyl sulphide from methane.

12 Claims, 19 Drawing Sheets

OTHER PUBLICATIONS

PCT ISR.
PCT WO.
Behaviors of Methane and Carbon Dioxide in 27-31 the Isotypic Nanoporous Metal Terephthalates MIL-53 and MIL-4T Journal of the American Chemical Society, American Chemical Society, Washington, DC, US, vol. 127, 2005, pp. 13519-13521, XP002432929 ISSN: 0002-7863.
First Office Action From Chinese Patent Office.

* cited by examiner

POROUS SOLIDS, SELECTIVE SEPARATIONS, REMOVAL OF SULFUR COMPOUNDS, ADSORPTION

RELATED APPLICATIONS

This application claims priority to and the benefit of PCT Application Serial No. PCT/US07/17729, filed 9 Aug. 2007 (Aug. 9, 2007), which claims priority to and the benefit of U.S. Provisional Patent Application Ser. No. 60/836,806 filed 10 Aug. 2006 (Aug. 10, 2006).

BACKGROUND OF THE INVENTION

1. Field of the Invention

The present invention relates to a class of porous metal organic materials has novel selective adsorption characteristics and for methods of making and using same.

More particularly, the present invention relates to a class of porous metal organic materials has novel selective adsorption characteristics, where materials are based on trans linked chains of metal oxygen octahedra that are cross-linked by aromatic dicarboxylic acids and for methods of making and using same.

2. Description of the Related Art

Many applications of nanoporous materials such as molecular sieving, ion exchange and functional nanocomposites are based on specific interactions between the host frameworks and removable guest species. The capacity and selectivity of nanoporous materials in absorption and in separation of molecular mixtures depend on specific interactions between the host frameworks and removable guest species and in some cases the degree to which the structure of the host lattice can relax as molecular species are intercalated. Detailed structural data are critical to understand these interactions.

The classical zeolite frameworks are relatively rigid and exhibit little deformation upon loading and unloading of various guest species.[1] On the other hand, intercalation into layered structures leads to expansion of the interlayer separation because of the very weak interlayer bonding, and can lead to complete exfoliation of the layers.[2]

Variable flexibilities without loss of crystallinity are expected for structures containing rigid building blocks linked by relatively deformable hinge-like units. Examples of framework flexibility have been found in a number of metal-organic frameworks (MOFs).[3] Among them, a group of compounds first reported by Férey and coworkers,[4] based on chains of trans corner-sharing octahedra $MO_6$ ($M=V$,[4] $Cr$,[5] $Al$,[6] $Fe$,[7] $In$[8]) cross-linked by 1,4-benzene dicarboxylate (BDC) upon removal or absorption of guest species show remarkable framework flexibility. The first member of the group [V(OH)BDC]($H_2$BDC)$_x$ was designated as MIL-47 as.[4] The guest $H_2$BDC molecules are removed on heating in air and the $V^{3+}$ ions are oxidized to $V^{4+}$ without changing the framework topology. The product, VOBDC (designated MIL-47) was observed to absorb different small guest molecules. No structural information on the absorbed guest molecules is available although the structure of MIL-47 was solved from single crystal data.[4]

Sorption studies of these metal organic frameworks have focused on $H_2$ adsorption,[9] but some studies of the absorption of $CO_2$[10] and $CH_4$[11] have been reported. Of particular relevance to this work is the paper by Férey and coworkers on the adsorption of $CH_4$ and $CO_2$ by MOHBDC (M=Cr, Al) and VOBDC.[11a] The V(IV) phase VOBDC shows some differences in the absorption isotherms compared with the trivalent compounds, but the amounts of $CO_2$ adsorbed above 10 bar are comparable. The relatively weak enthalpy of adsorption suggested that VOBDC has no specific adsorption sites for $CO_2$.[11a]

Thus, there is a need in the art for improved absorbants or absorbents, especially for sulfur containing compounds.

SUMMARY OF THE INVENTION

The present invention provides a class of porous metal organic materials has novel selective and reversible adsorption characteristics. The materials are based on trans linked chains of metal oxygen octahedra that are cross-linked by aromatic dicarboxylic acids. The materials contain diamond shaped channels that permit access of aromatic and other molecules. The general composition can be written as MOADA, where M is a tetravalent metal or a mixture of tetravalent metals, O is an oxygen atom, and ADA is an aromatic dicarboxylic acid dianion ($H_2$ADA). The inventors have found that MOADA compounds selectively and reversibly adsorb sulfur-containing components of fluids (gases or liquids), such as hydrocarbon fluids, resulting in the selective reduction of a concentration of sulfur-containing components in the hydrocarbon fluids. In the case of gaseous fluids, the inventors have found that the absorbents operate effectively at a total pressure of 1 atmosphere at ambient temperature. The absorbents, therefore, are suitable for desulfurizing any fluid, gas or liquid, especially hydrocarbon fluids. The inventors believe that the absorbents are better suited for hydrocarbon fluids having relatively low viscosity as use of the absorbents with higher viscosity fluids may result in unacceptable fluid losses.

A specific example is the compound VOBDC, where V is vanadium, O is an oxygen atom, and BDC is benzenedicarboxylate, the dianion of benzene dicarboxylic acid ($H_2$BDC). VOBDC has been found to selectively and reversibly adsorb thiophene from octane, a separation that indicates potential use for sulfur removal from hydrocarbon fluid such as diesel, gasoline or the like. VOBDC also been found to selectively and reversibly adsorb sulfur compounds such as dimethyl sulfide and thiophene from methane or ethane at a total pressure of 1 atmosphere at ambient temperature.

The present invention provides a method for removing sulfur from a fluid, including the step of contacting the fluid with an effective amount of at least one absorbent of the general formula MOADA, where M is a tetravalent metal or a mixture of tetravalent metals, O is an oxygen atom and ADA is an aromatic dicarboxylic acid dianion, where the effective amount is sufficient to reduce a concentration of sulfur-containing components in the fluid or to reduce a concentration of sulfur-containing components in the fluid to desired lower concentrations. The process can also include the step of removing the absorbent from the fluid and heating the absorbent to recover the absorbed sulfur-containing components regenerating the absorbent. The process can include repeating the steps of contacting, removing and regenerating on intermittent, periodical, semi-continuous or continuous basis.

The present invention provides a system including at least one vessel containing at least one absorbent of this invention. The system also includes a source of a fluid including sulfur-containing components. The system also includes piping and valves sufficient to connect the vessel to the source of the fluid. The system is adapted to remove the sulfur-containing components in the fluid or reduce concentration of the sulfur-containing components in the fluid, when the fluid is brought into contact with the absorbent. If the absorbent is in a column, then a residence time of the fluid in the column, a temperature of the column and a pressure of the column can be adjusted to achieve a given reduction in sulfur-containing components in the fluid.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
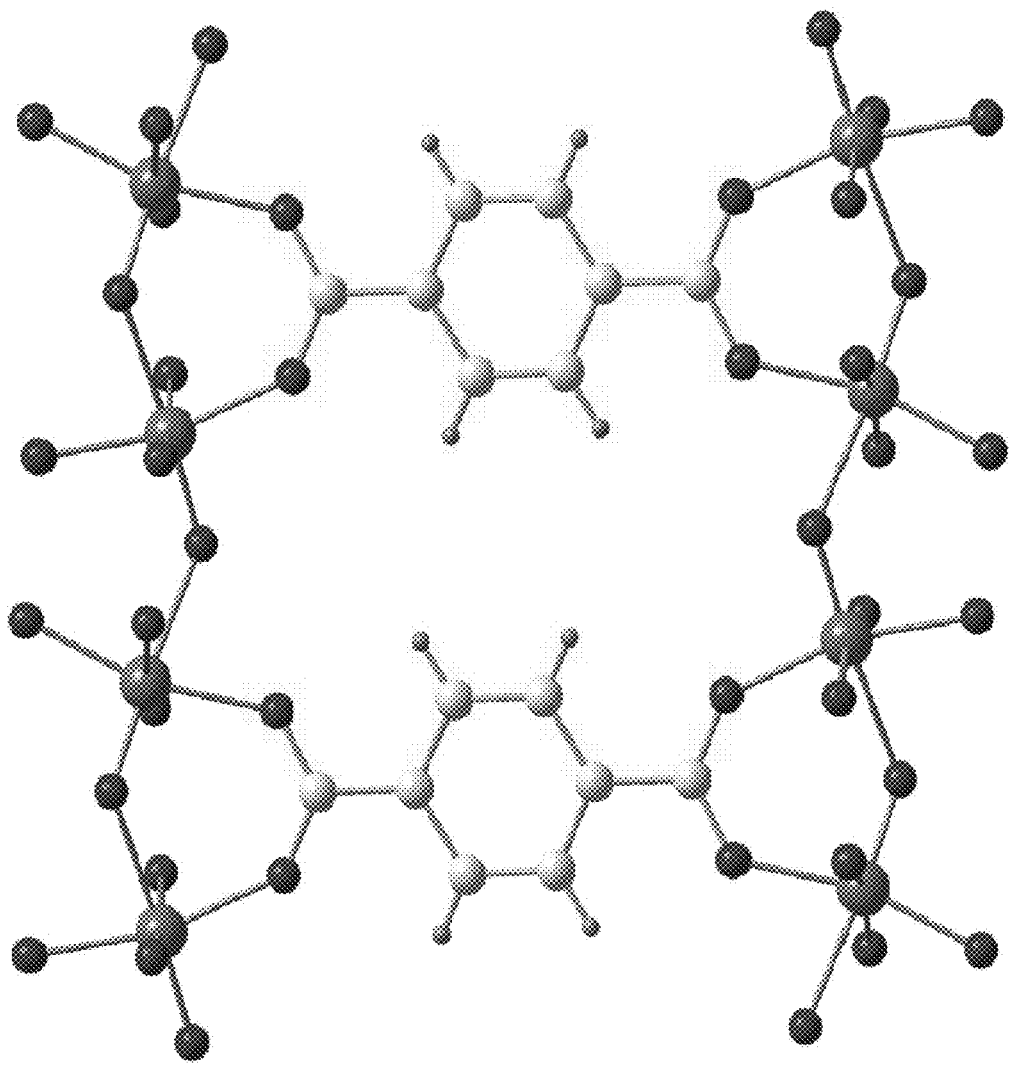
FIGS. 1A-H depict the structures of: (A) [VOBDC] 0.7 ($C_8H_6O_4$), 1; (B,C) [VOBDC](aniline), 3; (D,E) [VOBDC](thiophene)$_{0.91}$, 4; (F,G) [VOBDC](acetone), 5, and (H) a collection of images of 1, 2, 3 and 4 for comparison purposes.

The inventors have found that a new class of absorbant or absorbent molecules can be constructed and that the new absorbants or absorbents can be used to reduce the content of sulfur-containing compounds in a fluid such as hydrocarbon fluids, e.g., chemicals, refinery streams, fuels, oils, lubricants, natural gas, crude natural gas (sour gas), or other hydrocarbon fluids including such components.

The present invention broadly relates to absorbents of the general formula MOADA, where M is a tetravalent metal or a mixture of tetravalent metals, O is an oxygen atom and ADA is an aromatic dicarboxylic acid dianion.

The present invention broadly relates to a method for removing sulfur from a fluid, including the step of contacting the fluid with an effective amount of at least one absorbent of the general formula MOADA, where M is a tetravalent metal or a mixture of tetravalent metals, O is an oxygen atom and ADA is an aromatic dicarboxylic acid dianion, where the effective amount is sufficient to reduce a concentration of sulfur-containing components in the fluid or to reduce a concentration of sulfur-containing components in the fluid to desired lower concentrations. The process can also include the step of removing the absorbent from the fluid and heating the absorbent to recover the absorbed sulfur-containing components regenerating the absorbent. The process can include repeating the steps of contacting, removing and regenerating on intermittent, periodical, semi-continuous or continuous basis.

The present invention broadly relates to a system including at least one vessel containing at least one absorbent of this invention. The system also includes a source of a fluid including sulfur-containing components. The system also includes piping and valves sufficient to connect the vessel to the source of the fluid. The system is adapted to remove the sulfur-containing components in the fluid or reduce concentration of the sulfur-containing components in the fluid, when the fluid is brought into contact with the absorbent. If the absorbent is in a column, then a residence time of the fluid in the column, a temperature of the column and a pressure of the column can be adjusted to achieve a given reduction in sulfur-containing components in the fluid. Generally, when a column is used, there are at least two columns. While one column is desulfurizing the other column is regenerating. Of course, the system can include a number of columns with appropriate piping and valves to permit desulfurization and regeneration on a continuous or semi-continuous basis. If the system is batch, then a batch of fluid is contact with an amount of absorbent in an appropriate vessel under conditions to reduce the sulfur-containing components to a desired lower value. The conditions include at least residence time of the fluid in the vessel, the temperature of the vessel and the pressure of the vessel. For continuous system, the absorbent is fed into a fluid bed vessel or a moving bed vessel, where absorbent is continuously removed, regenerated and supplied to the vessel.

The present invention broadly relates to a disposable sulfur absorbent for purifying case including an inline cartridge including at least one absorbent of this invention, where the cartridge is adapted to be placed in a transfer line between a fluid source and the fluid destination. The cartridge can also includes a means for identifying when the absorbent must be regenerated.

Suitable Reagents

Suitable metals for use in the MOADA absorbents of this invention include, without limitation, aluminum (Al), vanadium (V), chromium (Cr), iron (Fe), titanium (Ti), zirconium (Zr), hafnium (Hf), cerium (Ce), or mixtures thereof.

Suitable dicarboxylic acids include, without limitation, any aryl or alkaryl dicarboxylic acid. Exemplary examples include, without limitation, 1,4-benzene dicarboxylic acid (terephthalic acid), 1,3-benzene dicarboxylic acid (isophthalic acid), 4,4'-diphenyl dicarboxylic acid, 2,5-pyridine dicarboxylic acid, 1,4-naphthylene dicarboxylic acid, 1,5-naphthylene dicarboxylic acid, other rigid aryl dicarboxylic acids or mixtures thereof.

Suitable fluids include, without limitation, any gas, liquid or mixtures or combinations thereof including undesirable levels of sulfur-containing components. Exemplary fluids include, without limitations, water, sewer gas, hydrogen gas, syngas, chemical gases and/or liquids, hydrocarbon gases and/or liquids, biological gases and/or liquids, biochemical gases and/or liquids, any other gas and/or liquid containing undesirable levels of sulfur-containing components or mixtures or combinations thereof. Exemplary hydrocarbon fluids include, without limitation, natural gas (sweet or sour), diesel fuel, gasoline, kerosene, jet fuel, refinery cuts, alkanes containing 1 to 20 carbon atoms, alkenes containing 1 to 20 carbon atoms, alkynes containing 1 to 20 carbon atoms, or mixtures or combinations thereof or mixtures or combinations thereof, where one or more carbon atoms can be replaced by a main group element selected from the group consisting of B, N, O, Si, P, S, Ga and Ge and one or more of the hydrogen atoms can be replaced by F, Cl, Br, I, OR, SR, COOR, CHO, C(O)R, C(O)NH2, C(O)NHR, C(O)NRR', or other similar monovalent groups, where R and R' are the same or different and are carbyl group having between about 1 to about 16 carbon atoms and where one or more of the carbon atoms and hydrogen atoms can be replaced as set forth immediately above.

Suitable sulfur-containing components include, without limitation, hydrogen sulfide, alkyl, aryl, alkaryl, and aralkyl sulfide, disulfide and undesirable other sulfur-containing compounds generally found in fluid.

Preparation and Characterization of the Absorbents and Absorbent/Absorbed Species Interaction Single crystals of [VOBDC]$(H_2BDC)_{0.71}$ 1 were synthesized directly, where V is vanadium, O is oxygen, BDC is 1,4-benzene dicarboxylate (the dianion of 1,4-benzene dicarboxylic acid), and $H_2BDC$ is 1,4-benzene dicarboxylic acid. [VOBDC]$(H_2BDC)_{0.71}$ (1), is the $V^{4+}$-analog of the previously compound MIL-47 as.[9] After removal of the guest acid molecules by heating 1 in air, the resulting VOBDC structure showed sufficient flexibility to undergo single-crystal-to-single-crystal transformations upon absorption of aniline, thiophene, and acetone from the liquid phase. After absorption, we were able to characterize the resulting structure detailing the guest structure, framework-guest interactions, and framework deformations from single crystal X-ray diffraction data.

We have also observed rapid and highly selective gas phase absorption of thiophene from methane by VOBDC, a process relevant to desulfurization of fluids including sulfur-containing components such as hydrocarbon gases, e.g., natural gas to produce so call sweet natural gas. This and other applications of MOFs were described in a recent review.[12]

The octahedral chain in the structure of [VOBDC]$(H_2BDC)_{0.71}$ 1 contains a —V═O—V═O— backbone with alternating short and long V—O apical bonds of the $VO_6$ octahedra. The equatorial corners of the $VO_6$ octahedra are shared with the BDC ligands that cross-link the octahedral chains to form 1D rhomb-shape tunnels which are each filled by two columns of guest $H_2BDC$. Assuming that the $H_2BDC$ molecules in each column are linked by hydrogen bonds similar as to the bonding in In(OH)BDC.$(H_2BDC)_{0.75}$,[8] and that a $H_2BDC$ molecule has a length of 9.6 Å, a theoretical number of 0.71 guest $H_2BDC$ per vanadium atom can be derived from the lattice constants. This guest acid content has been confirmed by chemical analysis and structure refinements.[13]

The [M(OH)BDC]$(H_2BDC)_x$ phases have the same space group symmetry as M(OH)BDC with the guest $H_2BDC$ molecules in neighboring tunnels oriented perpendicular to each other. The same arrangement of the guest molecules is found in the compound 1, probably because this pattern allows all columns of the guest $H_2BDC$ molecules to have favorable π-π interactions with the framework BDC. The columns of the $H_2BDC$ molecules in different tunnels of the compound 1 are found disordered over positions shifted relative to each other along the tunnel axis in steps of ca. 1.4 Å. If viewed along the tunnel axis, the $H_2BDC$ molecules in neighboring tunnels are oriented perpendicular to each other so that all columns of guest $H_2BDC$ molecules have favorable π-π interactions with the framework BDC. This arrangement of the guest molecules is not compatible, however, with the symmetry Pnma of the compound 2 that has a mirror plane running through the —O═V—O═V— backbone. The space group symmetry of the compound 1 is lowered to the non-centrosymmetric $P2_12_12_1$, which was confirmed by SHG (second harmonic generation) measurements. The SHG efficiency measured on a powder sample of the compound 1 is comparable to that of quartz.

Although the structures of the compound 2 and M(OH)BDC, M=$Al^{3+}$, $Cr^{3+}$ and $V^{3+}$, have the same topology and the same space group Pnma, they show important differences in local symmetry. In the compound 1, the metal atom is located at an inversion center while the symmetry mirror planes are perpendicular to the octahedral chain and pass through the centers of the BDC ligands. In the compound 2, the inversion symmetry center is shifted to the center of the BDC ligand, because the $V^{4+}$ ion is displaced from the center of a $VO_6$ octahedron to form a V═O double bond. The mirror plane is parallel to the octahedral chain and runs through the —V═O—V═O— backbone. This symmetry difference between the frameworks naturally leads to different space group symmetries of the corresponding compounds intercalated by the guest $H_2BDC$ molecules.

By heating the compound 1 in air to remove the guest acid, high quality single crystals of VOBDC 2 identical to MIL-47 were obtained and were observed to show single-crystal-to-single-crystal transformations upon absorption of various guest molecules. Accurate structural data of the guest molecules and framework deformations obtained from single crystal X-ray diffraction data are reported here. The thermal removal of the guest $H_2BDC$ led to crystals of VOBDC 2 suitable for single crystal X-ray measurement.[14] Our determination of the structure of VOBDC 2 is in agreement with that reported earlier by Férey.[4]

Figure 1B:
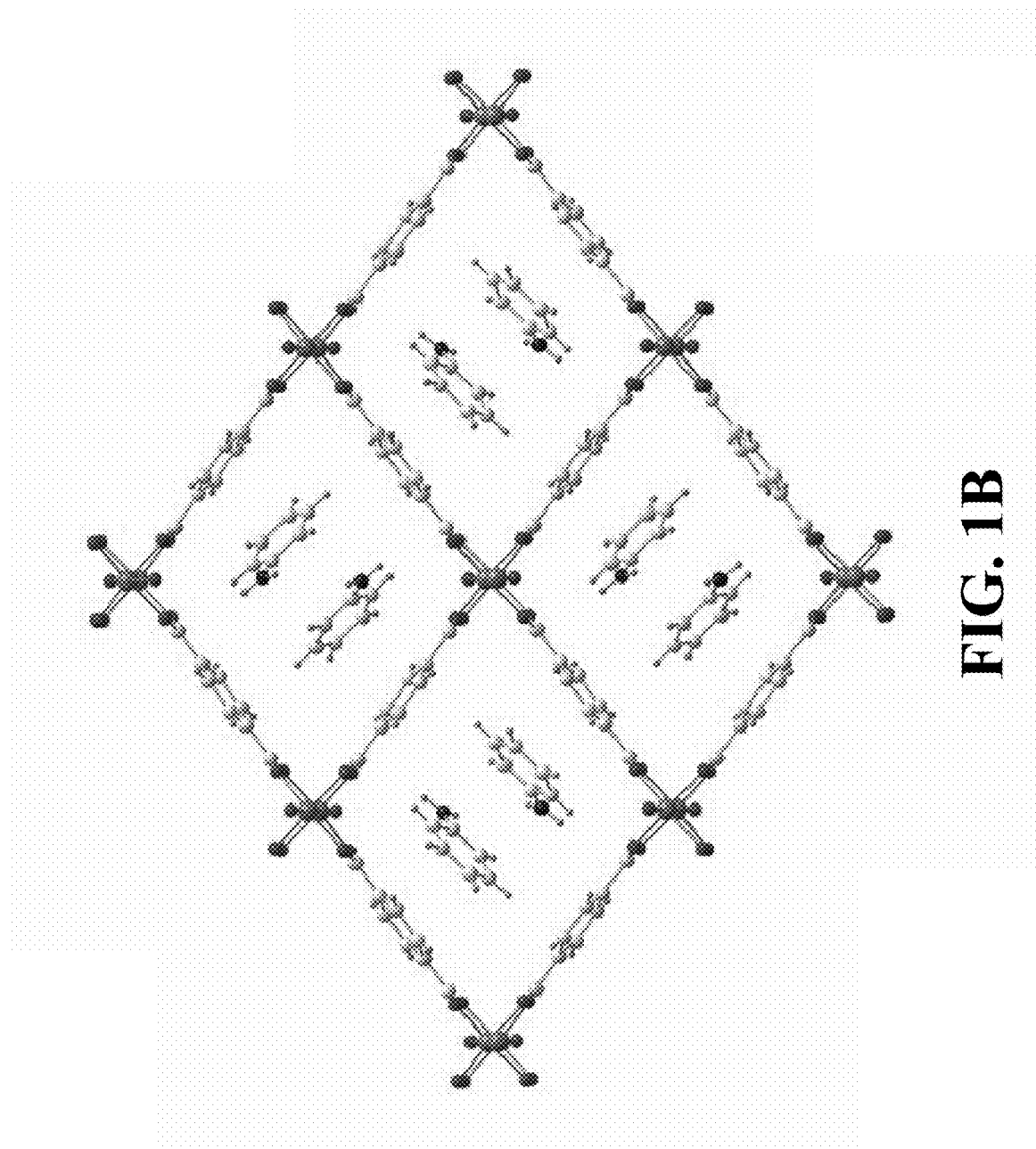
Figure 1C:
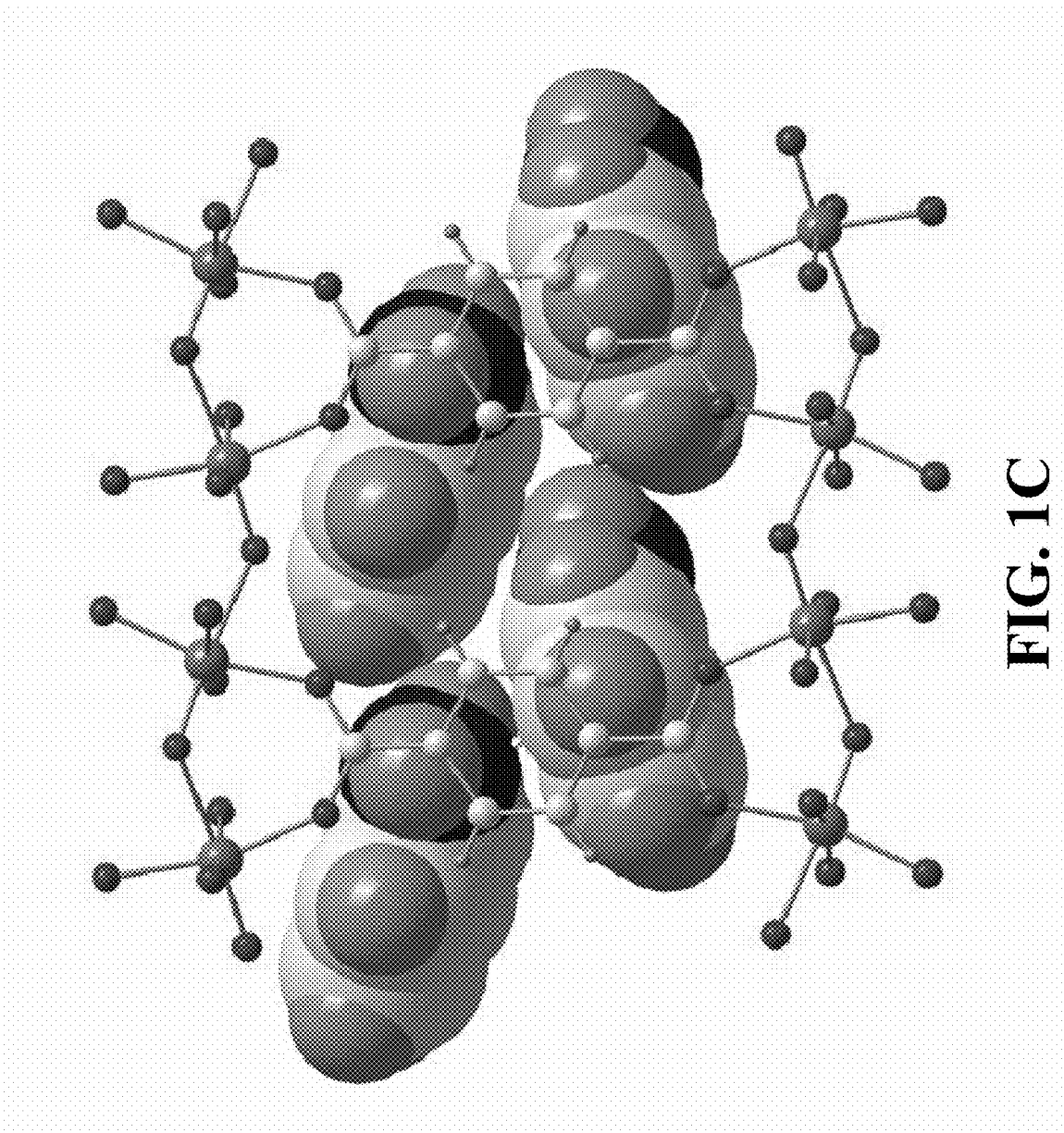
Figure 1D:
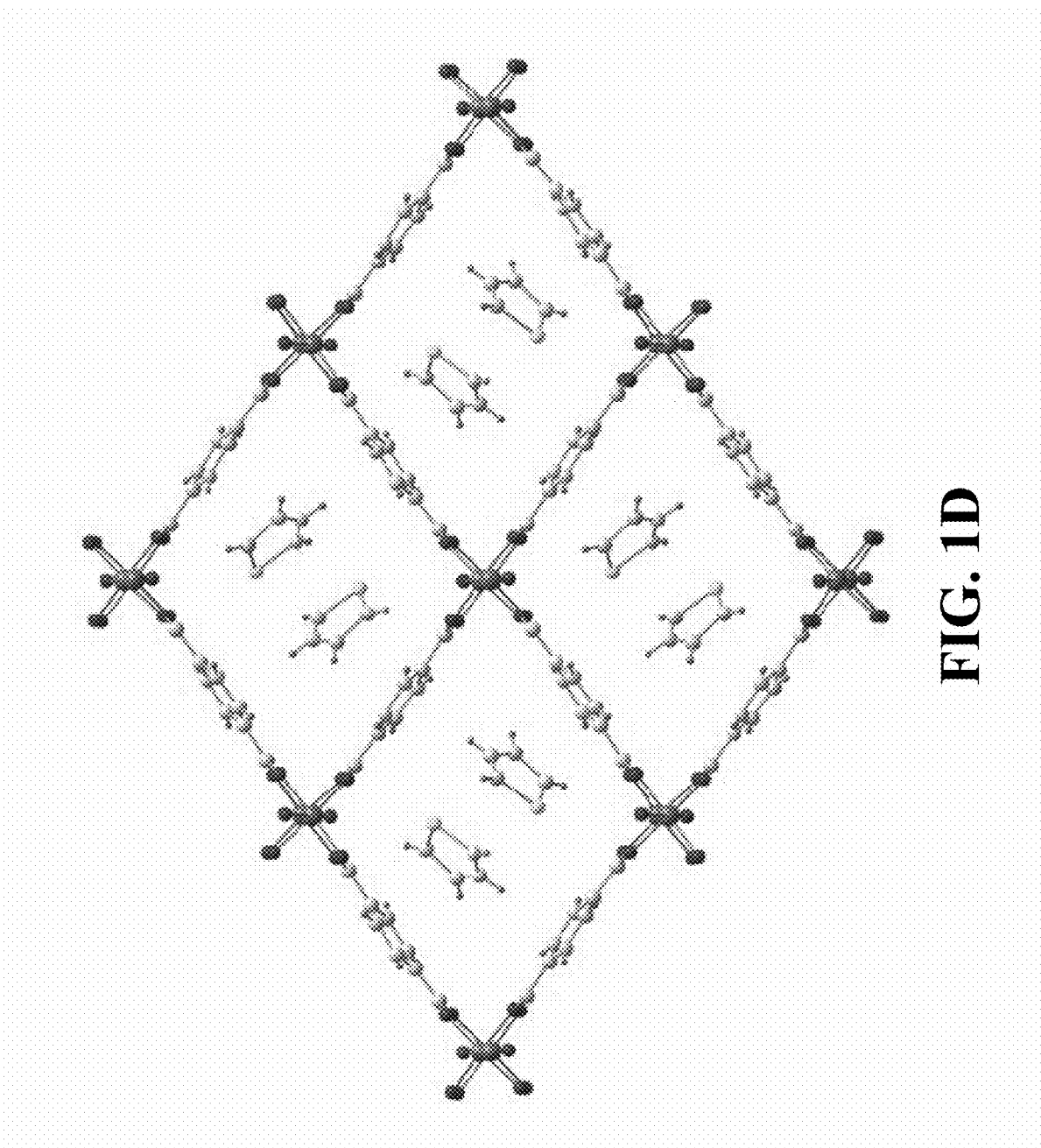
Figure 1E:
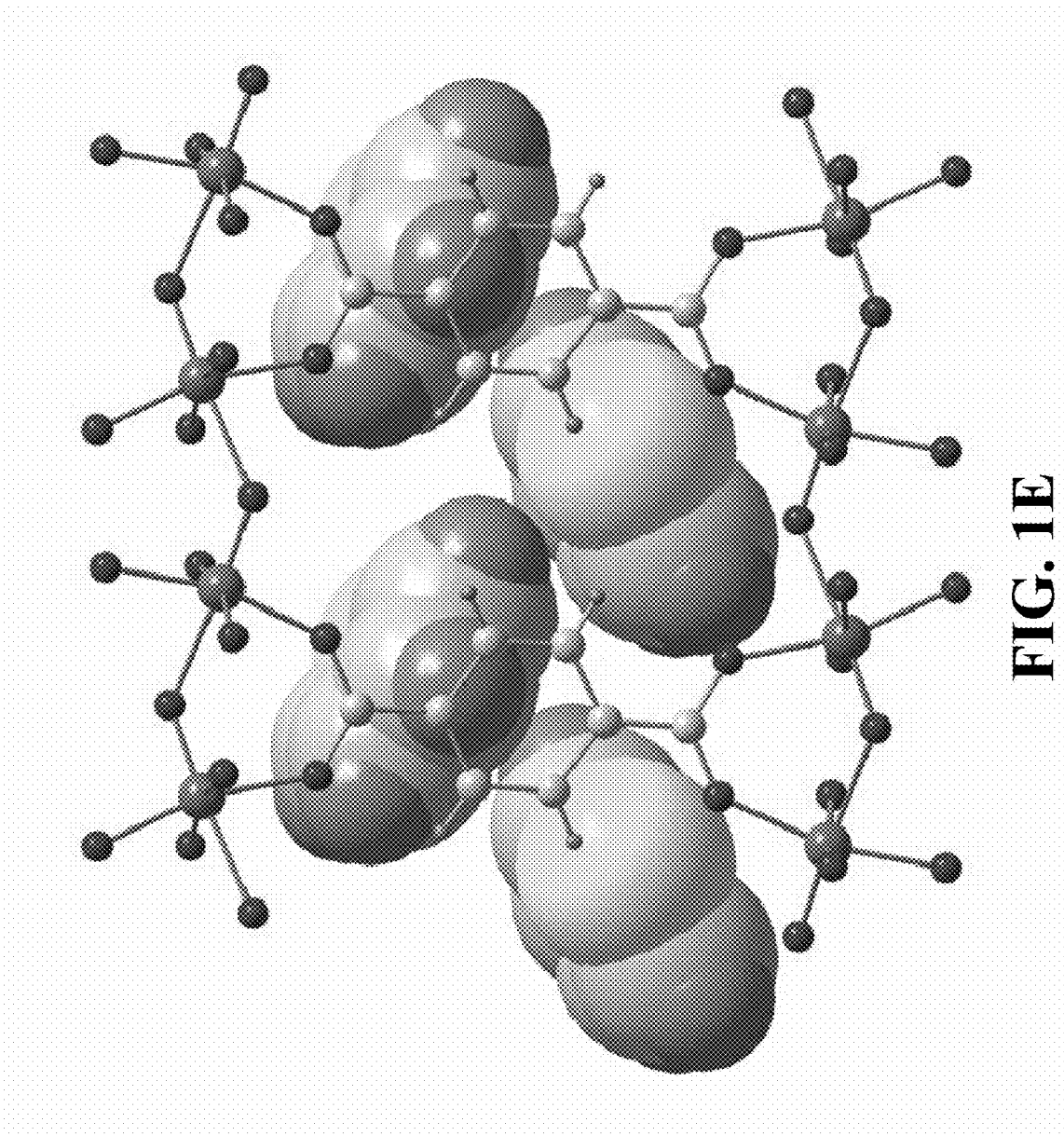
Figure 1F:
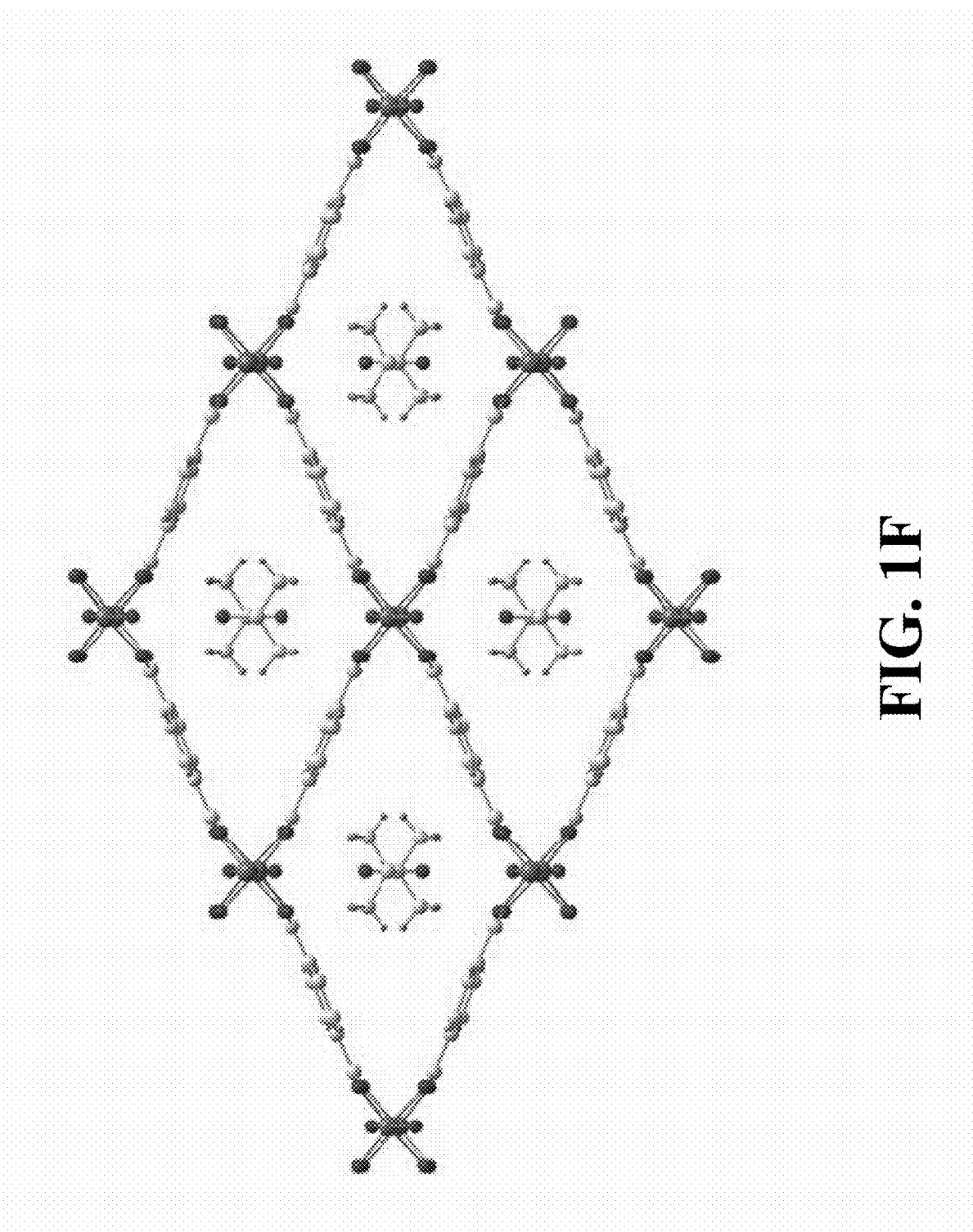
Figure 1G:
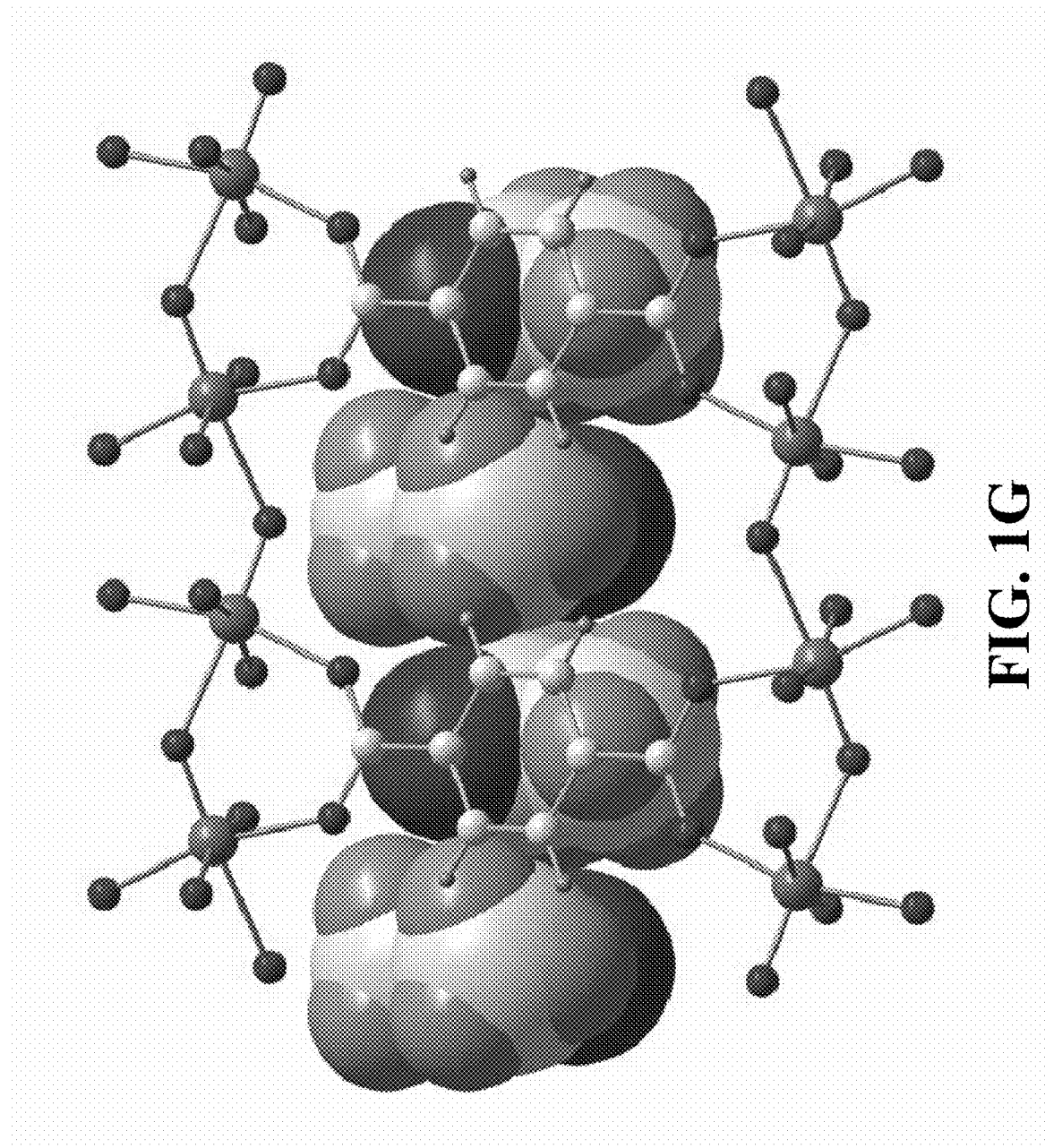
Figure 1H:
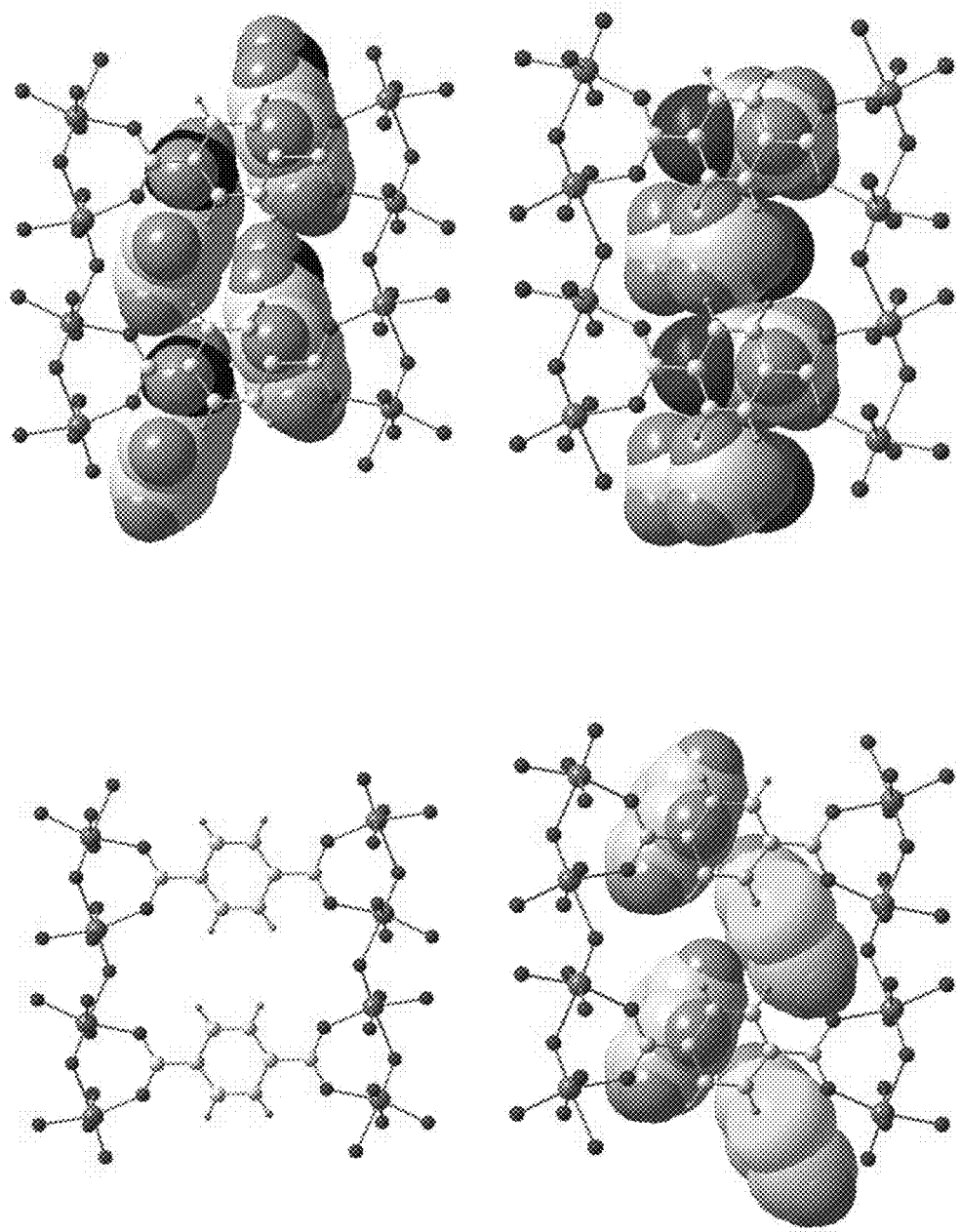

Upon immersing in liquid aniline, thiophene and acetone, the crystals of the compound VOBDC 2 as shown in FIG. 1A, are transformed into an intercalation compound [VOBDC](aniline) 3 as shown in FIGS. 1B&C, into an intercalation compound [VOBDC](thiophene)$_{0.91}$ 4 as shown FIGS. 1D&E and into an intercalation compound [VOBDC] (acetone) 5 as shown in FIGS. 1D&G, respectively. The compounds 3, 4, and 5 are transformed from the compound 2, without losing their crystallinity of the single crystal part of each structure. FIG. 1H shows all four compounds 2, 3, 4, and 5, where compounds 3, 4 and 5 are shown with their guest molecule in their proper orientations.[15]

The aniline molecule (ca. 7.5 Å long) is much shorter than $H_2BDC$, but still longer than the period (6.8 Å) of the VOBDC framework along the tunnel axis. The intercalated aniline molecules in the compound 3 form angles of ±17° to the tunnel axis, which can be considered as a compromise between adapting to the framework period, maximizing packing efficiency, and facilitating π-π interactions with the framework BDC ligands. The shortest distance between the benzene ring center of aniline and the carbon atoms of the BDC benzene ring is 3.507(1)Å, and the distance between their benzene ring centers is 4.43(1)Å, which indicates a π-π interaction with substantial ring-ring offset.[15] The π-π interactions are complemented by weak C—H . . . π and N—H . . . π interactions between the aniline molecules and the BDC ligands.[12]

The packing of thiophene molecules in the compound 4 is similar to aniline in the compound 3, but the angles between the thiophene molecules and the tunnel axis are changed to ±26°, probably due to the smaller molecular size of thiophene relative to aniline. A clear C—H . . . π interaction between the thiophene molecules and the framework BDC seems to play a major rule in dictating the thiophene orientation.[16] The occupancy of the thiophene position was refined to 0.91(1) in agreement with the absorption measurements as described below. Similar to the compound 1, the guest molecule packing in the compounds 3 and 4, which result from the weak interactions between the guest molecules and the host framework, is not compatible with the space group symmetry of VOBDC. The centrosymmetric space group Pnma of VOBDC changes to the chiral space group $P2_12_12_1$ upon loading of the guest aniline or thiophene molecules.

Unlike the aniline and thiophene molecules that form two columns in each tunnel, the acetone molecules in the compound 5 are stacked into one column along the tunnel axis with an antiparallel packing pattern. The intermolecular C=O . . . C=O distances between about 3.506(1)Å and about 3.510(1)Å within the column indicate weak dipolar carbonyl-carbonyl interactions between the acetone molecules, which probably dictate the packing pattern.[17] The VOBDC tunnel is too small to host two columns of the antiparallel-packed acetone molecules. With only one column of acetone molecules in each tunnel the framework deforms so that the rhomb-shaped tunnel section flattens substantially. The flattening not only improves packing efficiency of the whole structure but also facilitates dipolar interactions between the carbonyl group of acetone and the carboxylate groups of the framework BDC ligands (C=O . . . $CO_2$: 3.267(1)Å). The packing of the acetone molecules is compatible with the symmetry of the VOBDC framework, therefore, the compound 5 has the same space group symmetry as VOBDC, represent by the compound 2.

The VOBDC structure 2 has the most open tunnels. Upon intercalation of guest molecules, the tunnel opening systematically shrinks, because of the interactions between the guest molecules and the host framework. This is illustrated by the ratio of the two diagonals of the tunnel section which changes from 13.99/16.06 (0.87) in the compound 2 to 13.03/16.85 (0.77) in the compound 3, to 12.74/16.88 (0.75) in the compound 4, to 12.62/17.09 (0.74) in the compound 1, and to 10.21/18.41 (0.55) in the compound 5. For comparison, the shrinkage in going from $Al(OH)BDC.H_2BDC$ to Al(OH) $BDC.H_2O$ is even larger, 19.05/7.78(0.41). The deformations are realized mainly through changes of the torsion angle V—O=C—C, which is the most flexible component of the framework. The packing density calculated for the guest molecule column of the compound 5 is 122.2 Å$^3$ per acetone molecule, which is almost identical to that of liquid acetone. In contrast, the guest packing densities calculated for the compound 3 and the compound 4 are both ca. 21% lower than the corresponding liquid densities of the guest molecules assuming a full occupancy, probably because the oriented interactions between the guest molecules and the framework BDC ligands also dictate the stoichiometry of the intercalated compounds.

Figure 2:
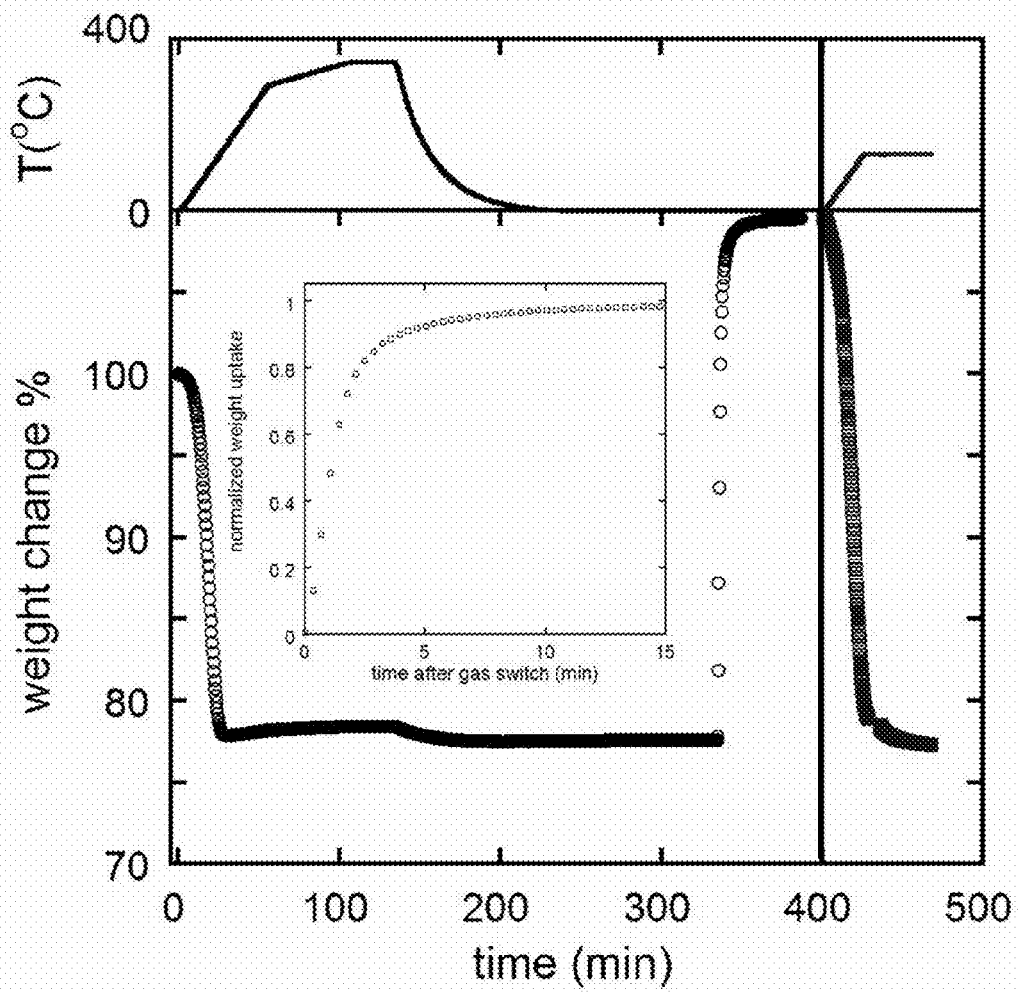
FIG. 2 is a plot of thiophene uptake by VOBDC from methane saturated with thiophene at ambient temperature. The temperature profile is shown in the top panel and the corresponding weight change in the bottom panel. The inset shows an expanded view of the thiophene uptake kinetics. The right panel shows a second experiment in which a sample saturated with thiophene at ambient is heated to 150° C. (blue data).

Thiophene is also absorbed by VOBDC directly from the gas phase as shown in FIG. 2. Single crystals of VOBDC× $0.71H_2BDC$ were heated on a thermo-balance in flowing air to 350° C. to remove the $H_2BDC$ guest molecules as shown in the top, left plot. After cooling to room temperature the gas stream was switched to a 5% $CH_4$/He stream. The data in FIG. 2 show that methane is not absorbed under these conditions as shown in the bottom, left plot. The gas stream was switched to a 5% $CH_4$/He stream saturated with thiophene at ambient temperature and a pressure of 1 atm (10 kPa at 20° C.). Rapid absorption occurs on exposure to methane/thiophene/He corresponding to the uptake of 0.88 molecules of thiophene per VOBDC in agreement with the liquid phase uptake as shown in the inset plot of FIG. 2. Similar results were obtained for the uptake of dimethyl sulfide, and thiophene at 1 kPa as tabulated in Table 1.

TABLE 1

| Gas Phase Adsorption by VOBDC | | | |
|---|---|---|---|
| Formula | +Δw % | Molecules/fu$^a$ | P$^b_{(kPa)}$ |
| $(CH_3)_2S$ | 34 | 1.12 | 66.9 |
| $C_4H_4S$ | 31.9 | 0.88 | 10 |
| $C_4H_4S^c$ | 23.4 | 0.65 | 1 |

$^a$formula unit;
$^b$partial pressure,
$^c$thiophene at 1 kPa.

The reversibility of thiophene uptake was investigated thermo-gravimetrically and by X-ray diffraction. A sample was saturated with thiophene on a thermobalance following the procedure described above. When the sample reached constant weight at ambient temperature, the temperature was raised to 150° C. Thiophene desorbed and the sample weight returned to its initial value as shown in the top, right and bottom, right plots of FIG. 2. An X-ray powder pattern of the final sample indicated complete retention of crystallinity.

A single crystal of [VOBDC](thiophene) was heated to 200° C. for 30 minutes to remove the thiophene. The results shows that the structure reverted back to space group Pnma and the complete absence of any electron density in the channels indicates complete desorption of thiophene. The lattice parameters are a=6.813(2)Å, b=16.248(4)Å, c=13.749(3)Å indicating a 1% smaller cell volume than of the compound 2 suggesting that annealing at >200° C. is necessary to allow the framework to completely relax.

The structural details of the four intercalated compounds presented here and the selective and reversible removal of sulfur-containing molecules from methane show the importance of non-covalent oriented weak interactions in the packing of organic molecules within channels of a specific metal-organic framework. Such interactions, although relatively weak, can readily cause remarkable deformation and symmetry changes in the framework, which point to effective ways of manipulating known materials or designing new materials with targeted properties through intercalation chemistry.
Preparation and Characterization of the Generalized Absorbents and Absorbent/Absorbed Species Interaction The metal oxide organic frameworks with the general composition $M(OH)BDC×H_2BDC$ where BDC=1,4-benzenedicarboxylate ($C_8H_4O_4$) and $H_2BDC$ is the corresponding acid ($C_8H_6O_4$) were first synthesized by Férey and co-workers who described in a series of papers the synthesis of compounds where M=Al, V, Cr, Fe. All of the compounds with the exception of V(III) OHBDC were obtained in polycrystalline form.[4,5,6,9a,18] In recent work, we have extended the class to include single crystals of $Al(OH)BDC×0.7H_2BDC$,[7] In(OH) $BDC×0.75H_2BDC$,[9] Fe(OH)BDC pyridine,[8] Fe(DMF) BDC,[8] and $M(III)VO[Fe_{0.28}V_{0.72}OH_{0.8}(NH_4)_{0.2}(C_8H_4O_4)]×$ 0.53 $(C_8H_6O_4)$.[10] The synthesis of the Fe,V compound and Férey's observation[4] that the V(III) compound can be oxidized to V(IV) suggest the possibility of making V(IV) OBDC, directly, which we described above.

Figure 3:
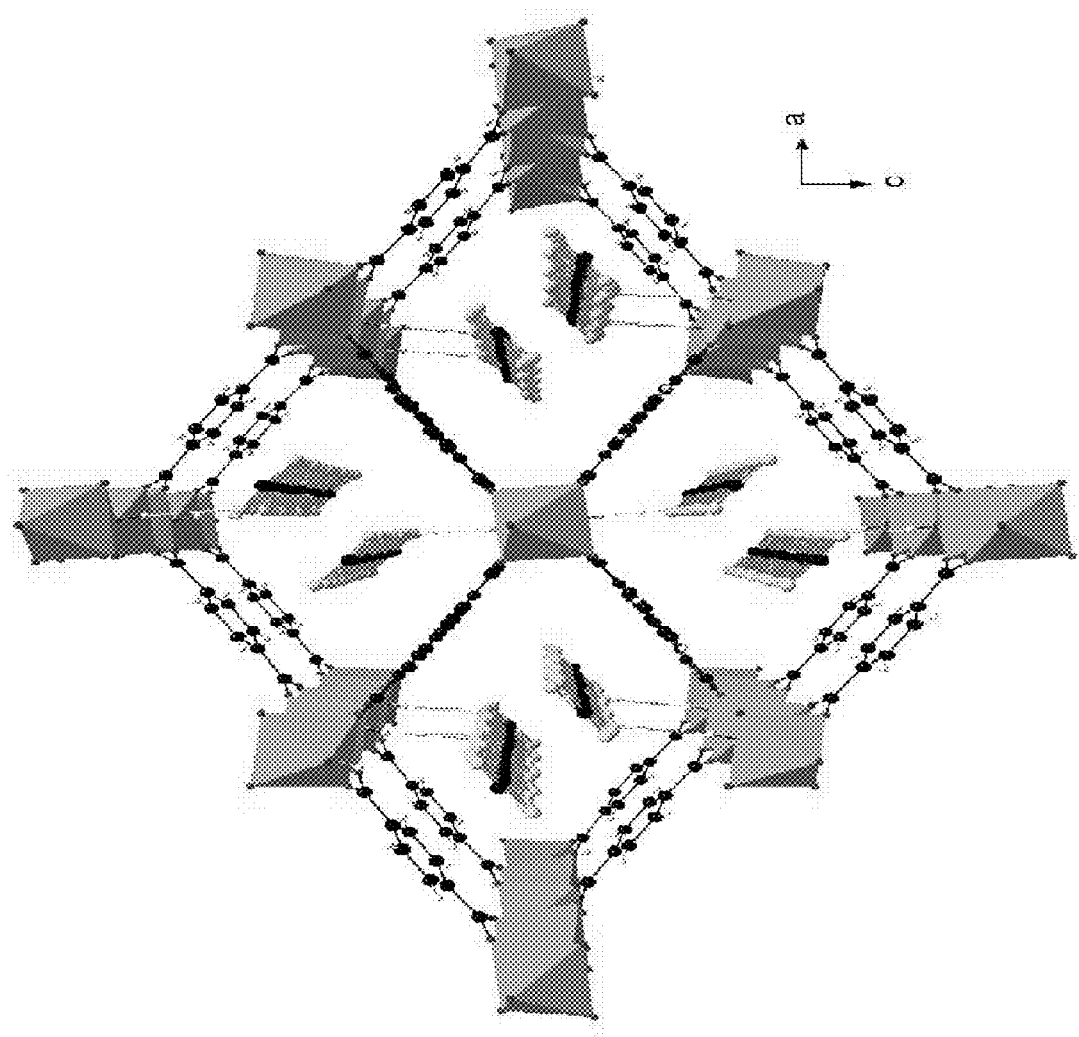
FIG. 3 depicts the structure of Al(OH)($C_8H_4O_4$) 0.7 ($C_8H_6O_4$), 1.

Referring now to FIG. 3, the structure of Al(OH) $(C_8H_4O_4)x_{0.7}(C_8H_6O_4)$ 6, which was recently determined by single crystal X-ray diffraction is shown. The $Al^{3+}$ is coordinated to six oxygen atoms in distorted octahedral geometry and the octahedral Al—O centers are linked by sharing trans hydroxyl groups forming Al—OH—Al chains. The Al—OH—Al chains are bent with an angle of ~129°. The oxygen atoms of the BDC groups occupy the equatorial positions of the octahedra. The BDC ligands bridge the chains to form a three dimensional framework with large diamond shaped channels parallel to the b axis as shown in FIG. 3.

As synthesized, the channels of Al(OH)($C_8H_4O_4$)×$_{0.7}$ ($C_8H_6O_4$) 6 are filled with $H_2$BDC guest molecules that can be removed by heating to a temperature between about 380° C. and about 400° C. After removal of the guest molecules, one water molecule is absorbed on exposure to atmosphere at room temperature to give Al(OH)($C_8H_4O_4$)×$H_2O$ 7; the water molecules are located at the center of the channels.

Sorption Chemistry

The sorption behavior of the M(OH)BDC compounds has not been studied in detail for applications and is presently not well understood. The sorption chemistry of these materials is unusual and falls between the behavior of rigid three-dimensional host lattices and layer structures that can expand infinitely in a direction perpendicular to the layers. In the BDC compounds, the expansion is constrained so that the maximum area for a guest molecule is proportional to the square of the distance between metal oxide chains and decreases as the angle of the diamond decreases of the structure shown in FIG. 3.

The table summarizes some of the known sorbates based on our work and on literature data. The first thing to note is the paucity of data and the second is that insufficient data is available to discern systematic trends; there are no sorption isotherms available. The known sorbates include hydrogen bond acceptors, aromatics, and others. The energetics of sorption are determined by the guest-host interactions, mainly hydrogen bonding with the framework OH groups and π-π or C—H π interactions with the bridging ligands, and by guest-guest interactions which may similarly be due to hydrogen bond or π-π interactions. The framework Al—OH groups are only weakly (if at all) acidic. The strongest acceptors like water and DMF form hydrogen bonds, but because of π-π interactions M(OH)BDC readily absorb mesitylene, thiophene, and pyridine as shown in the data tabulated in Table 2.

TABLE 2

Adsorption by M(OH)BDC of Various Compounds

| Compound | Sorbate | | | | | |
|---|---|---|---|---|---|---|
| Al(OH)BDC | $H_2$BDC | $H_2O$ | pyridine | thiophene | n-octane | $H_2$ |
| V(OH)BDC | $H_2$BDC | $H_2O$ | diethyl-ether | mesitylene | 2-Me-1-propanol | |
| Cr(OH)BDC | $H_2$BDC | $H_2O$ | DMF | | | $H_2$ |
| Fe(OH)NDC | | | pyridine | | | |
| Al(OH)NDC | | $H_2O$ | DMF | | | |

EXPERIMENTS OF THE INVENTION

Examples

The following examples are included for the sake of the completeness of the disclosure and to illustrate the present invention, but in no way are these examples included for the sake of limiting the scope or teaching of this invention.

Example 1

The compound 1 was synthesized by hydrothermal reaction from a mixture of $VO_2$, HCl, 1,4-benzene dicarboxylic acid ($H_2$BDC) and $H_2O$ with molar ratios of 1:2:0.5:770. The mixture was heated at 220° C. in a sealed Teflon vessel for 3 days. Red brown prisms of the compound 1 were recovered as a major phase by vacuum filtering and drying in air, together with dark green impurities that were easily removed by washing with methanol. For the absorption measurements, red prism crystals of VOBDC×0.71$H_2$BDC represented by the compound 1 were heated in air to 350° C. using a 3° C. min$^{-1}$ heat-up rate to form VOBDC represented by the compound 2. Intercalation experiments were carried out by immersing crystals of the compound 2 in liquid aniline, thiophene and acetone. For gas phase absorption, crystals of the compound 1 were heated on a thermobalance to 350° C. in air to remove $H_2$BDC. The sample was maintained at constant temperature for 30 minutes and then cooled to 28° C. When the weight was constant at 28° C., the air flow was switched to 5% methane in He. After the weight became constant, the flow of 5% methane in He was passed through a bubbler containing liquid ($CH_3$)$_2$S. After a short time, the weight of VOBDC increased dramatically.

Example 2

This example illustrates the synthesis of VOBDC by three different methods.

A mixture of $VO_2$, HCl, $H_2$BDC, and $H_2O$ in the molar ratios 1:2:0.86:32 were placed in a Teflon lined steel autoclave. The mixture was heated at 220° C. in the sealed vessel for 6 d and then cooled to ambient temperature. Red brown prism-shaped crystals of VOBDC bigger than 500μ are obtained in >60% yield, together with a dark green vanadium compound, which can be washed out easily by methanol.

A second synthesis used the same reaction conditions, but different starting reagents namely $VOSO_4$×3$H_2O$, ($NH_4$)$_2$BDC and $H_2O$ in the ratios 1:1:65. The product in the form of brown needles, is obtained in more than 95% yield.

In both of the syntheses described above the product is obtained in the form of VOBDC×$H_2$BDC. The free acid is then removed by heating to 340° C. in air to obtain VOBDC.

A third synthesis was developed at lower reaction temperature and at 1 atmosphere pressure to eliminate the need for pressure vessels in scale up. The reactants $VOSO_4$×3$H_2O$ (2 mmol), ($NH_4$)$_2$BDC (2 mmol), and DMF 20 mL were transferred into a round bottomed flask, which was fitted with a condenser. The mixture was heated with stirring at 160° C. for 3 days using an oil bath. A yellow brown powder was precipitated from the solution, filtered and washed with methanol. The product was confirmed to be VOBDC without extra acid molecules and requires no further treatment before use.

Example 3

This example illustrates the adsorption of thiophene from the gas phase by VOBDC.

Figure 4:
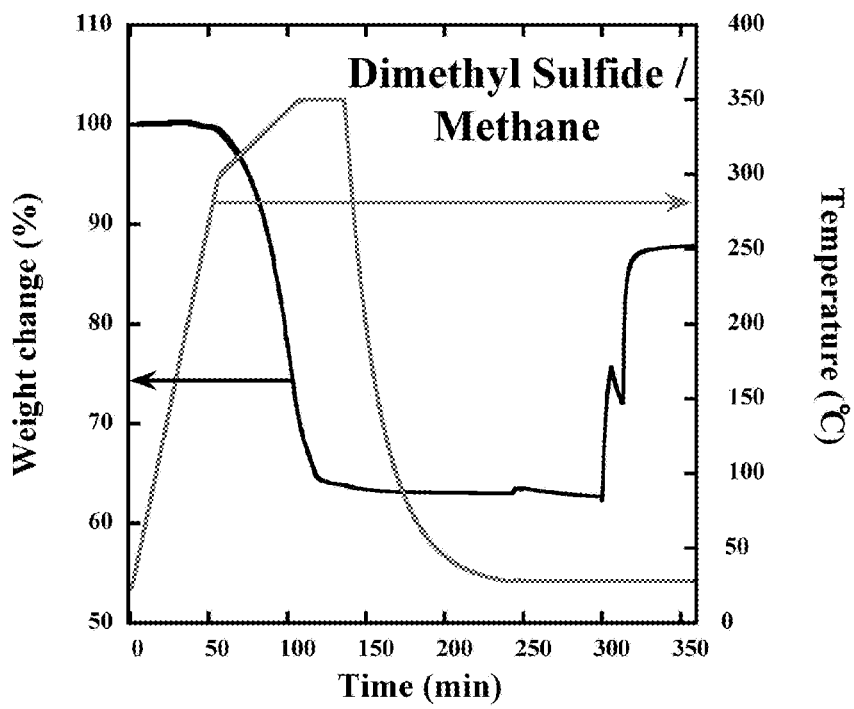
FIG. 4 is a plot of dimethyl sulfide absorption data.

Red prism crystals of VOBDC×$H_2$BDC were heated on a thermobalance in air to 350° C. using a 3° C. min$^{-1}$ heat-up rate. The temperature was maintained at constant temperature for 30 minutes and then cooled to room temperature, 28° C. When the weight was constant at 28° C., the air flow was switched to 5% methane in He. After the weight became constant, the flow of 5% methane in He was passed through a bubbler containing liquid ($CH_3$)$_2$S. After a short time, the weight of VOBDC increased dramatically. After 1.5 minutes, the weight change saturated. The increase of 34%, corresponds to the adsorption of 1.25 molecules of ($CH_3$)$_2$S. These results are shown graphically in FIG. 4.

Example 4

Figure 5:
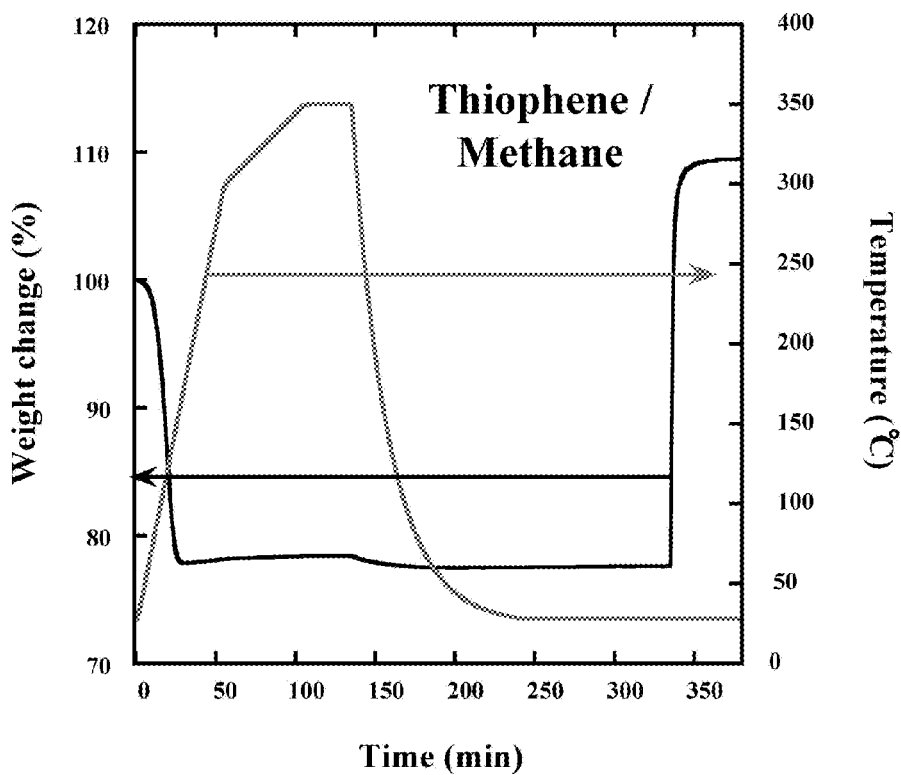
FIG. 5 is a plot of thiophene absorption data.

The same procedure was used as in Example 3 except that dimethyl sulfide replaced thiophene. These results are shown graphically in FIG. 5.

Example 5

This example illustrates the adsorption of thiophene from the gas phase by VOBDC.

Figure 6:
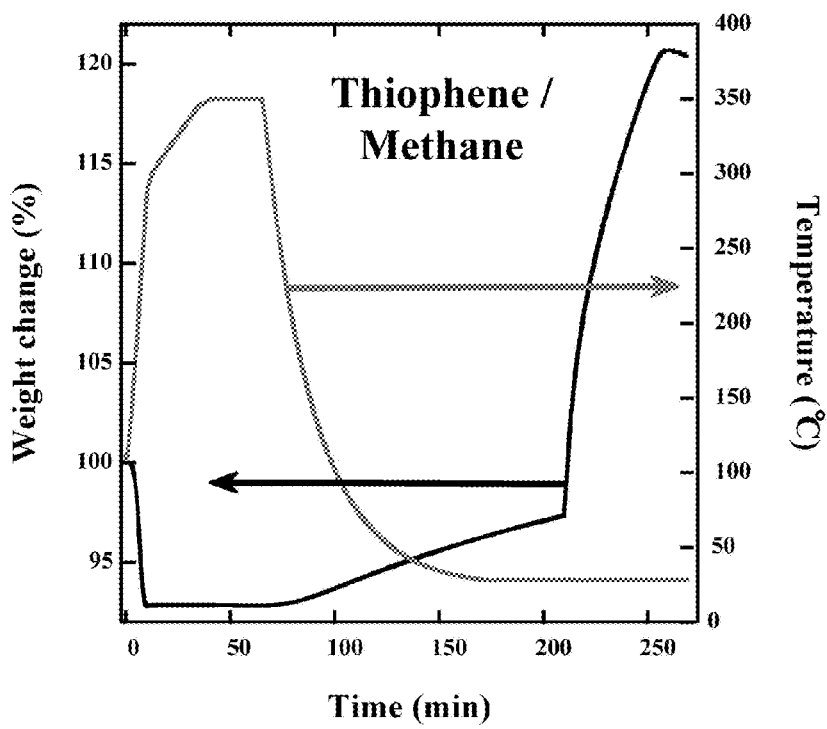
FIG. 6 is a plot of thiophene absorption data.

A 5 cc/min flow of 5% methane in He balance flow was passed through a bubbler containing thiophene. The exit stream was mixed with 90 cc/min 5% methane in He and then passed into the thermobalance. At the lower thiophene partial pressure compare to that used in Example 3, a longer time (26 min) was needed to reach constant weight and a smaller weight uptake was observed. A-6(R-30). These results are shown graphically in FIG. 6.

Example 6

Figure 7:
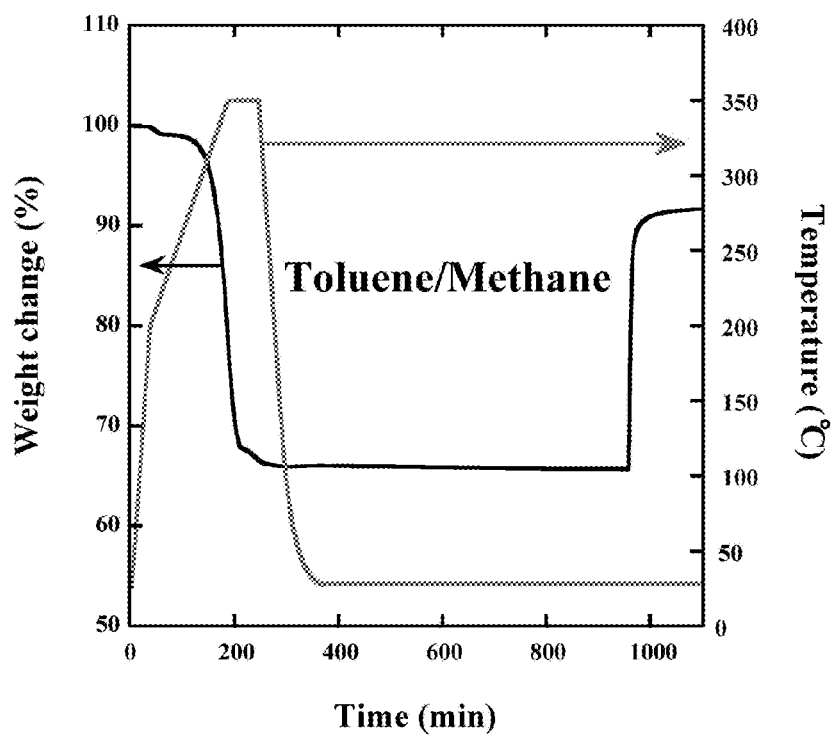
FIG. 7 is a plot of toluene absorption data.

The same procedure was used as in Example 4 except that toluene replaced dimethyl sulfide. P-59-1-2(27). These results are shown graphically in FIG. 7.

Example 7

Figure 8:
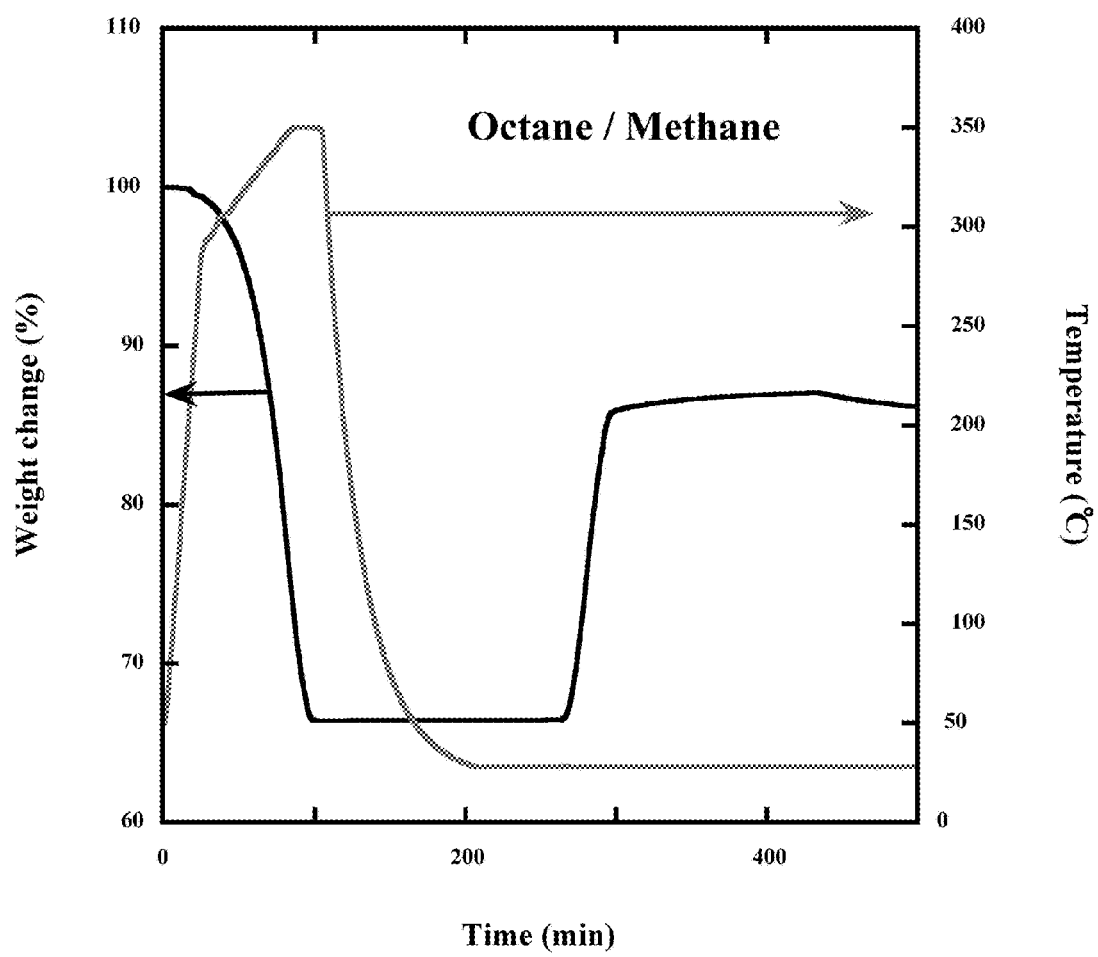
FIG. 8 is a plot of octane absorption data.

The same procedure was used as in Example 4 except that octane replaced dimethyl sulfide. A-4-1(R-27). These results are shown graphically in FIG. 8.

Example 8

The table summarizes the weight changes and time to equilibrium for Examples 3-7. Data for hexadecane are also given in the Table 3 obtained using conditions of Example 3. In this case the time to reach saturation is much longer (>13 h).

TABLE 3

Gas Phase Adsorption using VOBDC

| Example # | Adsorbate | Formula | +Δw % | Time (min) |
|---|---|---|---|---|
| 3 | Dimethyl Sulfide | $(CH_3)_2S$ | 34 | 1.5 |
| 4 | Thiophene | $C_4H_4S$ | 31.9 | 3 |
| 5 | Thiophene | $C_4H_4S$ | 23.4 | 26 |
| 6 | Toluene | $C_6H_5CH_3$ | 26 | 14 |
| 7 | Octane | $C_8H_8$ | 21 | 34 |
| 8 | Hexadecane | $C_{16}H_{34}$ | 12.5 | >13 h |

Example 9

This example illustrates the liquid phase adsorption of thiophene from an octane sample.

Figure 9:
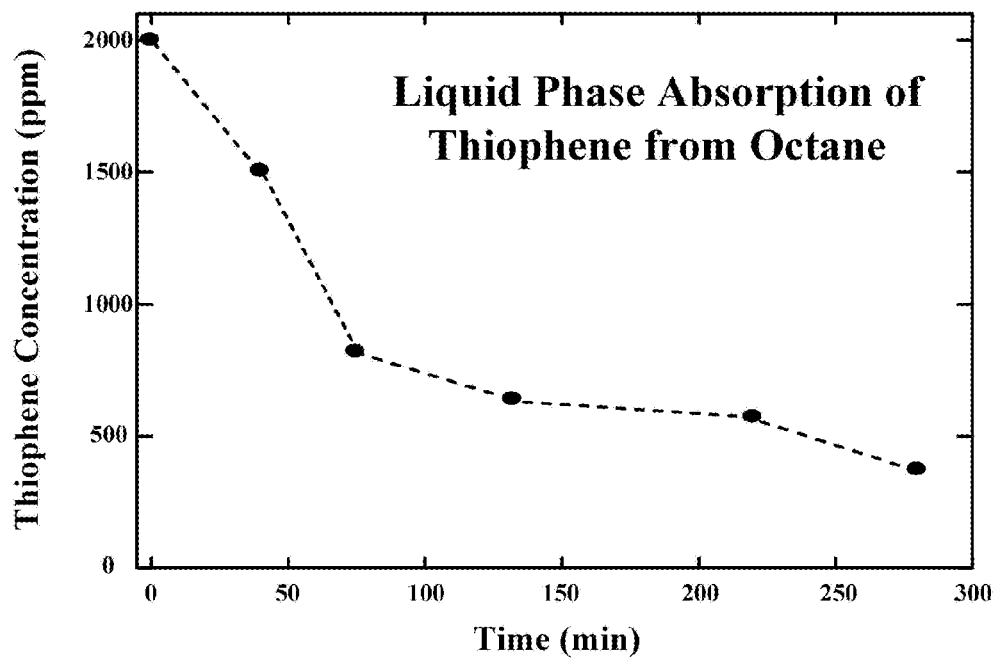
FIG. 9 is a plot of thiophene absorption data from octane.

VOBDC.$xH_2$BDC red crystals were ground and heated at 400° C. for 10 h in air to remove the guest $H_2$BDC molecules. A sample of VOBDC (0.5 g) was placed in a flask, and 15 mL of a solution of 2000 ppm of thiophene in octane added. The mixture was stirred and heated to 60° C. using an oil bath. Samples of the supernatant liquid were remove at regular intervals and analyzed using gas chromatography. A Shimadzu (SSI) Gas Chromatograph 2010 used to measure the thiophene contents of the samples was calibrated by standard solutions of thiophene in octane as tabulated in Table 4. These results are also shown graphically in FIG. 9.

TABLE 4

VOBDC Adsorption in 2000 ppm of Thiophene/Octane Solution

| Sample number | Time (min) samples taken | GC measurement (ppmw) |
|---|---|---|
| 0 | 0 | 2000 |
| 1 | 40 | 1506 |
| 2 | 75 | 821 |
| 3 | 132 | 640 |
| 4 | 220 | 574 |
| 5 | 280 | 375 |

Example 10

A 0.5 g sample of VOBDC was added to 60 ml of octane containing 100 ppm of thiophene. Samples of the supernatant liquid were remove at regular intervals and analyzed using gas chromatography. A Shimadzu (SSI) Gas Chromatograph 2010 used to measure the thiophene contents of the samples was calibrated by standard solutions of thiophene in octane as tabulated in Table 5.

TABLE 5

VOBDC Adsorption in 2000 ppm of Thiophene/Octane Solution

| Sample number | Time (min) | GC measurement (ppm) |
|---|---|---|
| 0 | 0 | 93 |
| 1 | 10 | 85 |
| 2 | 40 | 83 |
| 3 | 100 | 81 |
| 4 | 160 | 77 |

Figure 10:
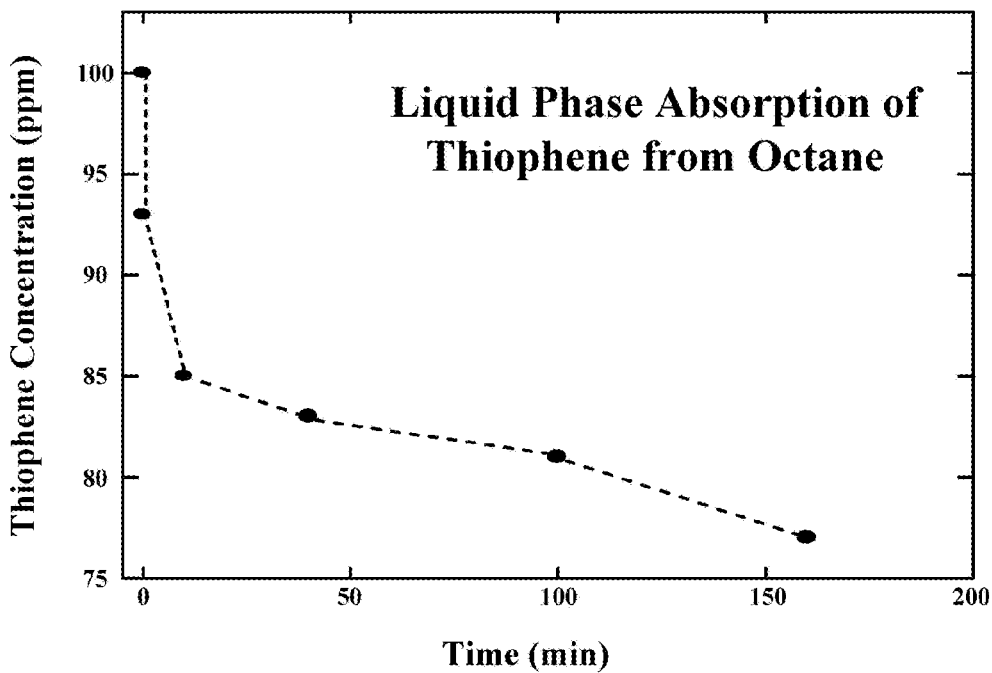
FIG. 10 is a plot of thiophene absorption data from octane.

These results are also shown graphically in FIG. 10.

APPARATUS OF THE INVENTION

Figure 11:
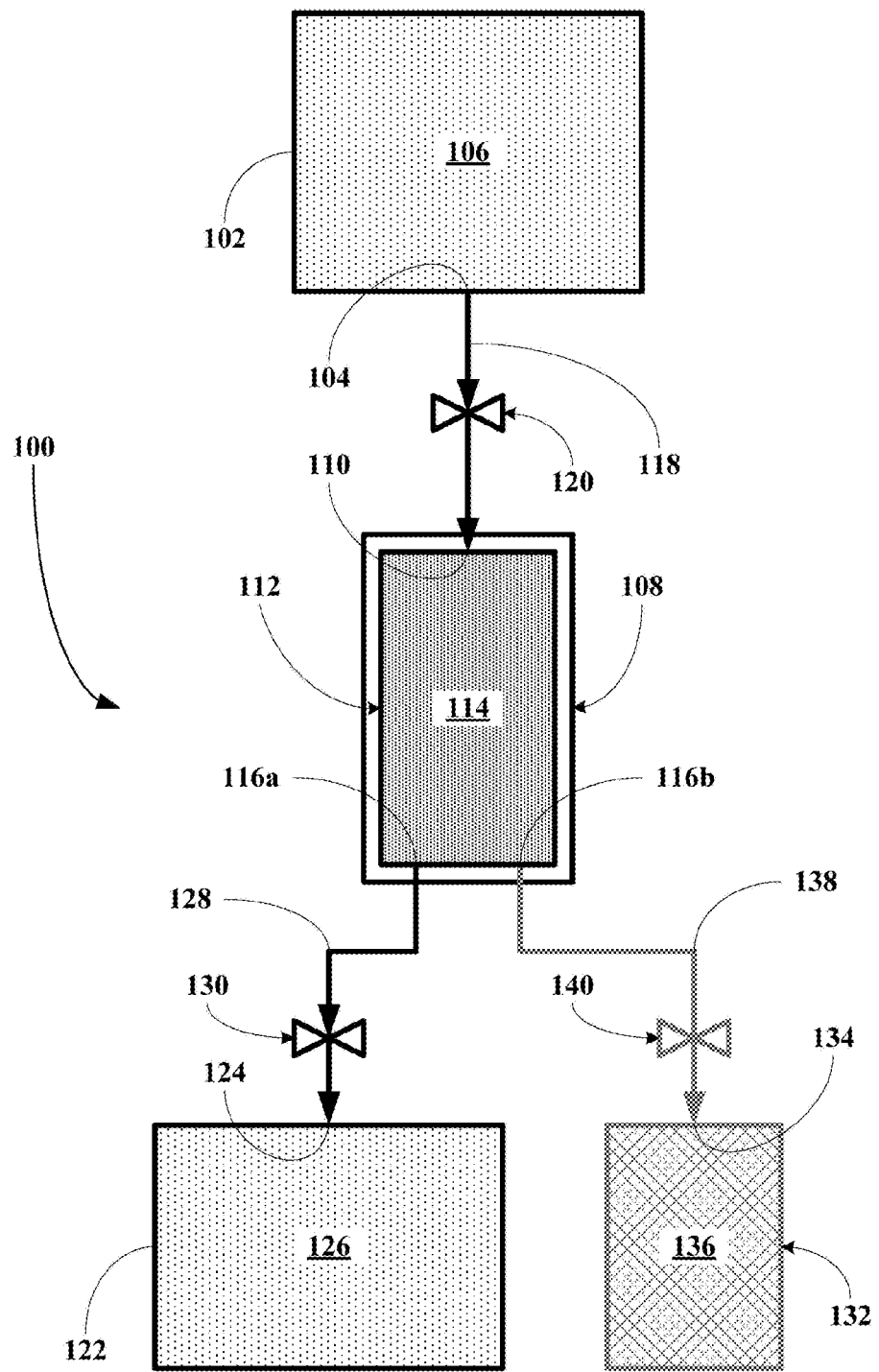
FIG. 11 depicts an embodiment of a batch system for desulfurizing a fluid using an absorbent of this invention.

Referring now the FIG. 11, an embodiment of an apparatus for reducing sulfur in a fluid, generally 100, is shown to include a fluid source reservoir 102 having an outlet 104 and filled with an input fluid 106, where the input fluid 106 includes sulfur-containing components. The apparatus 100 also includes a treating vessel 108 having an inlet 110, an interior section 112 filled with a MOADA absorbent 114 of this invention and two outlets 116a&b. The source reservoir outlet 104 is connected to the treating vessel inlet 110 via a conduit 118 including a first inline valve 120. The first inline valve 120 is adapted to start or stop the flow of the input fluid 106 from the source reservoir 102 to the treating vessel 108. The apparatus 100 also includes an output reservoir 122 including an inlet 124, where the output reservoir 122 is adapted to receive an output fluid 126, where the output fluid includes lower concentrations of the sulfur-containing components. The treating vessel outlet 116a is connected to the output reservoir inlet 124 via a conduit 128 including a second inline valve 130. The second inline valve 130 is adapted to start or stop the flow of the output fluid 126 from the treating vessel 108 to the output reservoir 122. The apparatus 100 also includes a sulfur-containing component collection vessel 132 including an inlet 134 and adapted to be filled with the absorbed sulfur-containing components 136, where the sulfur-containing component collection vessel 132 is adapted to receive the sulfur-containing components 136 absorbed by the MOADA 114 during regeneration of the absorbent 114. The treating vessel outlet 116b is connected to the collection vessel inlet 134 via conduits 138 including a third inline valve 140. The third inline valve 140 is adapted to start or stop the flow of the sulfur-containing components 136 from the treating vessel 108 to the collection vessel 132 during absorbent 114 regeneration. It should be recognized that the input and output reservoirs 102 and 122 can be vessels that have an outlet (not shown), a tank car, a pipeline, or any other type of fluid supply system or transport system. It should also be recognized that the collection vessel 132 can be a vessel that has an outlet, or any other type of vessel such as a tank car, a pipeline or any other type of fluid transport system.

The apparatus 100 operates by closing the third valve 140 and opening the first and second valves 120 and 130 to allow the input fluid 106 to flow through the absorbent 114 in the interior 112 of the treating vessel 108. As the fluid 106 passes through the interior 112 of the vessel 108, a portion of the sulfur-containing components 136 in the fluid 106 are absorbed by the absorbent 114 to produce the output fluid 126. The output fluid 126 is then stored in the output reservoir 122. The size of the interior 112, the fluid flow rate, the temperature and the pressure in the interior 112 of the vessel 108 are adjusted to achieve a desired reduction in the sulfur-containing components 136 in the output fluid 126. The input fluid 106 is processes until the absorbent is near or at its saturation level, at which point the valves 120 is closed and remaining fluid is drained from the vessel 108 into the output reservoir 122. Alternatively, the fluid remaining in the vessel 108 can be forced out by a gas. Once the remaining fluid has been removed from the vessel 108, the valve 130 is closed and the valve 140 is opened and the vessel 108 is heated to a release temperature. At the release temperature, the absorbed sulfur-containing components are released and flow into the collection reservoir 132. The regeneration process can include the use of a gas such as air or an inert gas such as nitrogen to aid in the regeneration process. After the sulfur-containing components have been desorbed, the valve 140 is closed and the valves 120 and 130 are opened and more input fluid 106 is processed. Processing is continued until the absorbent is no longer active. However, the inventors believe that the absorbent should work indefinitely if it is not fouled by materials that are not reversible absorbed. In most embodiments, the absorbents can be regenerated at least 10 times. In certain embodiments, the absorbents can be regenerated at least 20. In other embodiments, the absorbents can be regenerated at least 50. In other embodiments, the absorbents can be regenerated at least 100. In other embodiments, the absorbents can be regenerated at least 500. In other embodiments, the absorbents can be regenerated at least 1000.

Figure 12:
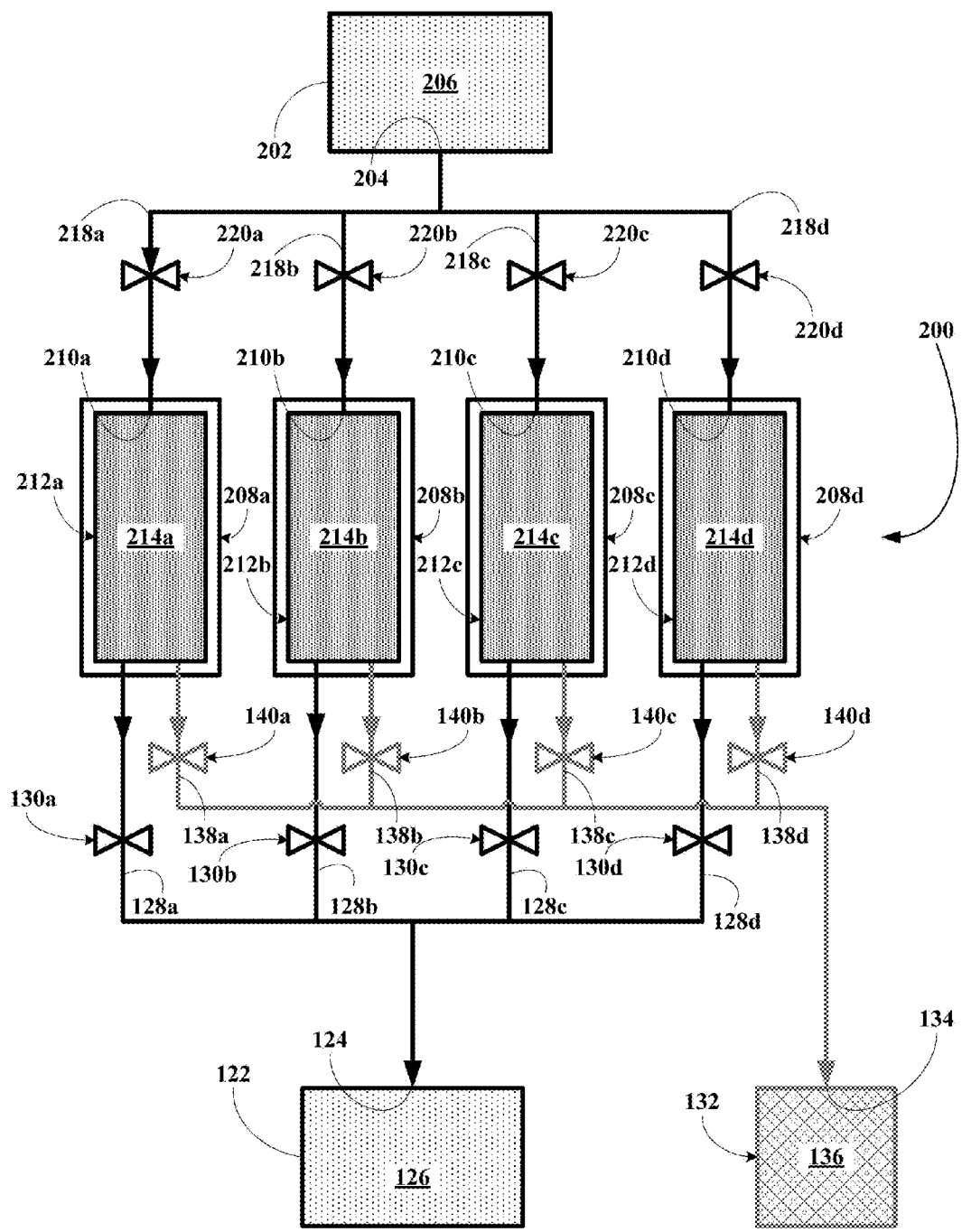
FIG. 12 depicts an embodiment of a semi-continuous or continuous system for desulfurizing a fluid using an absorbent of this invention.

Referring now the FIG. 12, an embodiment of an apparatus for reducing sulfur in a fluid, generally 200, is shown to include a fluid source reservoir 202 having an outlet 204 and filled with an input fluid 206, where the input fluid 206 includes sulfur-containing components. The apparatus 200 also includes four treating vessel 208a-d, each vessel 208a-d have an inlet 210a-d, an interior section 212a-d filled with a MOADA absorbent 214a-d of this invention and two outlets 216a-d and 217a-d. The source reservoir outlet 204 is connected to the treating vessel inlets 210a-d via conduits 218a-d including first inline valves 220a-d. The first inline valves 220a-d are adapted to start or stop the flow of the input fluid from the source reservoir 202 to the treating vessel 208a-d. The apparatus 200 also includes an output reservoir 222 including an inlet 224, where the output reservoir 222 is adapted to receive an output fluid 226, where the output fluid includes lower concentrations of the sulfur-containing components. The treating vessel outlets 216a-d are connected to the output reservoir inlet 224 via conduit 228a-d including second inline valves 230a-d. The second inline valves 230a-d is adapted to start or stop the flow of the output fluid from the treating vessels 208a-d to the output reservoir 222. The apparatus 200 also includes a sulfur-containing component collection vessel 232 including an inlet 234 and filled with the absorbed sulfur-containing components 236, where the sulfur-containing component collection vessel 232 is adapted to receive the sulfur-containing components 236 absorbed by the MOADA absorbents 214a-d during regeneration of the absorbent 214a-d. The treating vessel outlets 217a-d are connected to the collection vessel inlet 234 via conduits 238a-d including third inline valves 240a-d. The third inline valves 240a-d are adapted to start or stop the flow of the sulfur-containing components 236 from the treating vessels 208a-d to the collection vessel 232 during absorbent 214a-d regeneration. It should be recognized that the input and output reservoirs 202 and 222 can be vessels that have an outlet (not shown), a tank car, a pipe-line, or any other type of fluid supply system. It should also be recognized that the collection vessel 232 can be a vessel that has an outlet, or any other type of vessel. It should also be recognized that the absorbents, although generally the same, can be different so that different fluids can be treated. It should also be recognized that the four vessels can also be configured so that the input fluid flows through each vessel consecutively and each vessel can include a different absorbent of this invention, where the absorbents can be tailored to remove specific sulfur-containing components.

The apparatus 200 operates by closing the valves 240a-d and opening some or all of the first and second valves 220a-d and 230a-d to allow the input fluid 206 to flow through some of all of the absorbent 214a-d in the interiors 212a-d of the treating vessels 208a-d. As the fluid 206 passes through the interiors 212a-d of the vessels 208a-d, a portion of the sulfur-containing components 236 in the fluid 206 are absorbed by the absorbents 214a-d to produce the output fluid 226. The output fluid 226 is then stored in the output reservoir 222. The fluid flow rate, the temperature and pressure in the interiors 212a-d of the vessels 208a-d are adjusted to achieve a desired reduction in the sulfur-containing components 236 in the input fluid 206. The input fluid 206 is processes until the absorbent is near or at its saturation level, at which point some or all of the valves 220a-d are closed and remaining fluid is drained from the vessels 208a-d into the output reservoir 222. Alternatively, the fluid remaining in the vessels 208a-d can be forced out by a gas. Once the remaining fluid has been removed from the vessels 208a-d, some of all of the valves 240a-d are opened and the vessel is heated to a release temperature. At the release temperature, the absorbed sulfur-containing components are released and flow into the collection reservoir 232. The regeneration process can include the use of a gas such as air or an inert gas such as nitrogen to aid in the regeneration process. After the sulfur-containing components have been desorbed, some or all of the valve 240a-d are closed and some or all of the valves 220a-d and 230a-d are opened and more input fluid 206 is processed. Processing is continued until the absorbent is longer active. However, the inventors believe that the absorbent should work definitely if it is not fouled by materials that are not reversible absorbed. The absorbents can be regenerated at least 10 times. In certain embodiments, the absorbents can be regenerated at least 20. In other embodiments, the absorbents can be regenerated at least 50. In other embodiments, the absorbents can be regenerated at least 100. In other embodiments, the absorbents can be regenerated at least 500. In other embodiments, the absorbents can be regenerated at least 1000.

The system 200 is designed to run on a semi-continuous and/or continuous because one or more of the vessels 208a-d can be processing fluid, while one or more of the vessels 208a-d are being regenerated. The method operates by causing valves to switch the flow of the input fluid between vessels so that fluid can be processed on essentially a continuous basis.

Figure 13:
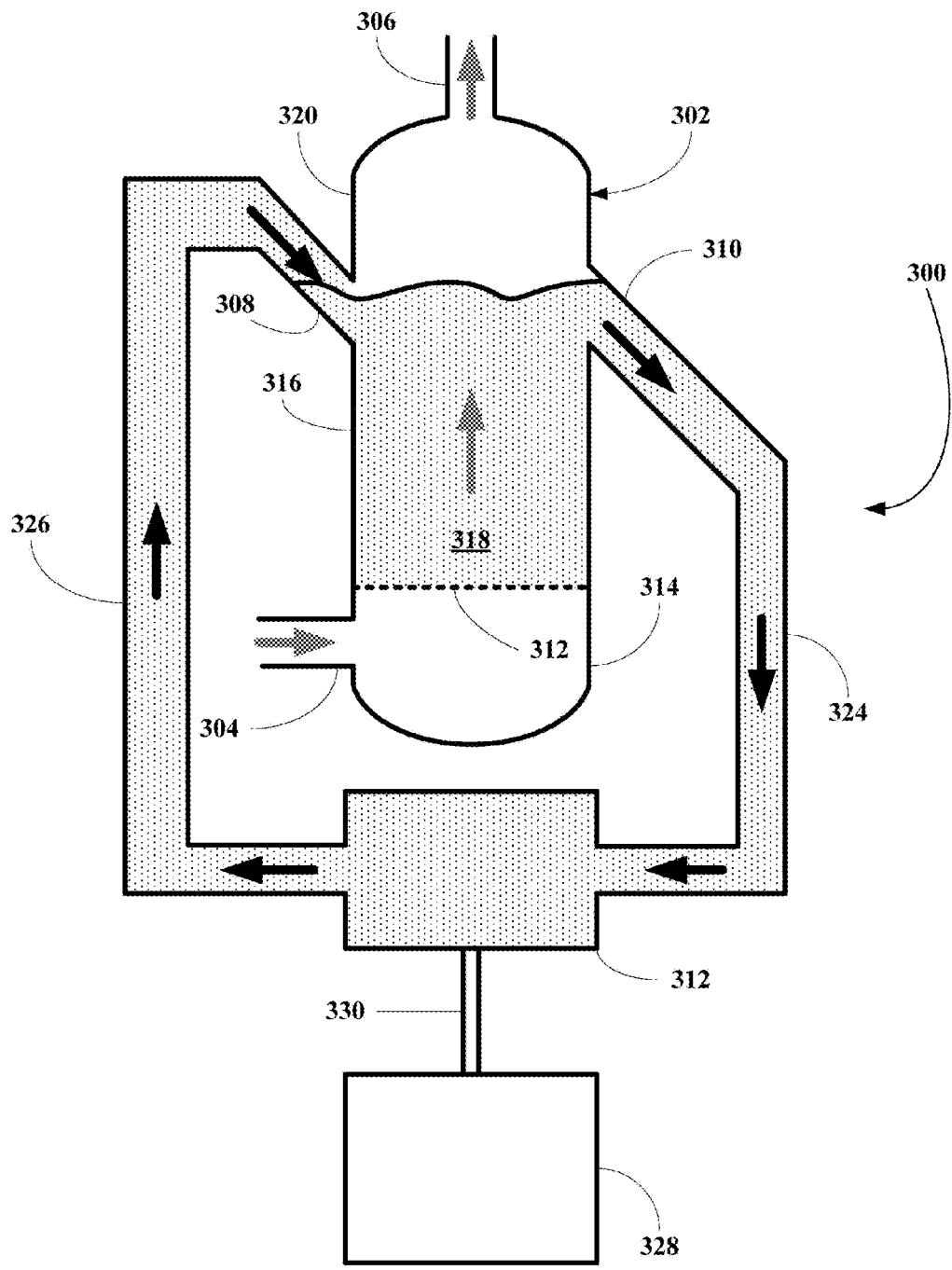
FIG. 13 depicts an embodiment of a fluid bed system for desulfurizing a fluid using an absorbent of this invention.

Referring now the FIG. 13, an embodiment of a fluid bed apparatus for reducing sulfur in a fluid, generally 300, is shown to include a fluid bed treating column 302. The column 302 includes a fluid inlet 304, a fluid outlet 306, an absorbent inlet 308, an absorbent outlet 310 and a screen 312. The screen 312 is adapted to prevent the absorbent particles 318 from falling into a lower section 314 of the column 302. The column 302 also includes a fluidized absorbent section 316 including the fluidized absorbent particles 318 and a top section 320, where treated fluid free of the absorbent particles 318 proceeds upward and out of the column 302 via the fluid outlet 306. The fluid inlet 304 is connected to an inlet fluid handling system (not shown) and the fluid outlet 306 is connected to an output fluid handling system (not shown). The absorbent outlet 310 is connected to a regenerator 322 via a first conduit 324 and the regenerator 322 is connected to the absorbent inlet 308 via a second conduit 326. As the absorbent particles 318 are circulated from the treating column 302 to the regenerator 322, where the absorbed sulfur-containing components absorbed by the absorbent particles 318 in the fluidized absorbent section 316 of the column 302 are desorbed. The flow rate of the absorbent, its size and shape, the flow rate of the fluid, the size, temperature and pressure of the treating column and the size, temperature and pressure of the regenerator are adjusted so that a desired reduction in sulfur-containing components can be achieved. The regenerator 322 is connected to a sulfur-containing component collection vessel 328 via a conduit 330. The apparatus 300 is designed to be operated on a continuous basis with absorbent being added and withdrawn as needed.

Inlet fluid enters the apparatus 300 on a continuous basis through the inlet fluid inlet 304. The fluid travels up the column 302 as indicated by the heavy grey arrows. As the fluid flow up, it passes through the screen 312, with sufficient velocity or flow rate to suspend the absorbent particles 318 in the fluid. Generally, the fluid is a gas, but the fluid can be a gas liquid mixture provided that the particle fluidization is achieved. In the absorbent fluidized section, sulfur-containing components in the inlet fluid are absorbed by the absorbent, producing an output fluid with lower concentrations of the sulfur-containing components. The output fluid then flows upward into the upper section 320 of the column which due to column conditions is substantially fee of absorbent particles 318 and exits the column 302 via the fluid outlet 306. Simultaneously, regenerated or fresh absorbent particles 318 are being fed into the column 302 via the absorbent inlet 308 and spent absorbent is withdrawn via the absorbent outlet 310 as shown by the heavy black arrows. The spent absorbent 318 is regenerated in the regenerator 322, where it is heated to desorb the absorbed sulfur-containing components, which are collected in the collector 328. The regenerated absorbent 318 is then fed back into the column 302 as shown by the heavy black arrows.

Figure 14:
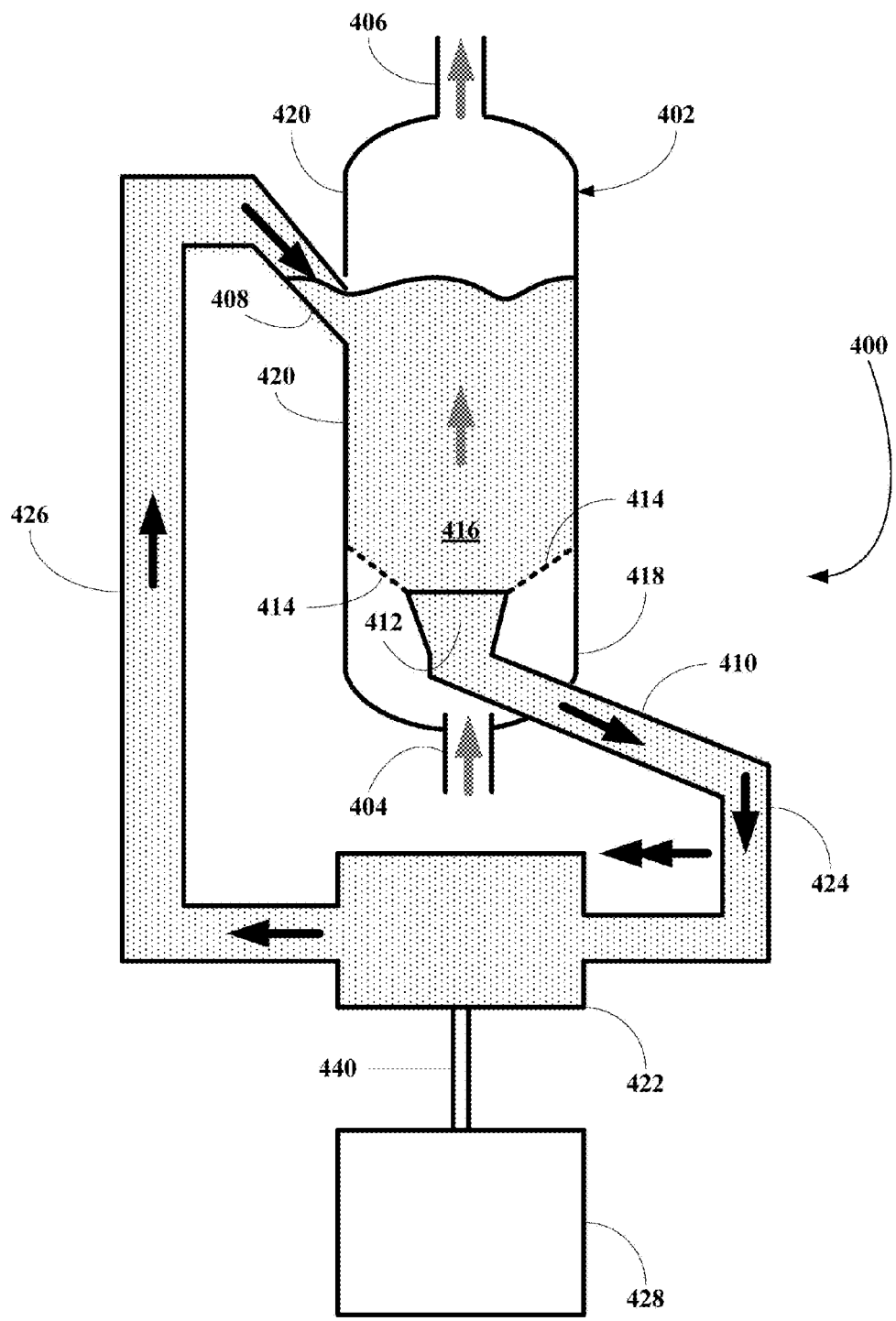
FIG. 14 depicts an embodiment of a moving bed system for desulfurizing a fluid using an absorbent of this invention.

Referring now the FIG. 14, an embodiment of a moving bed apparatus for reducing sulfur in a fluid, generally 400, is shown to include a moving bed treating column 402. The column 402 includes a fluid inlet 404, a fluid outlet 406, an absorbent inlet 408, an absorbent outlet 410 having a collector 412 and screens 414. The screens 414 are adapted to prevent an absorbent 416 from falling into a lower section 418 of the column 402. The column 402 also includes a moving absorbent section 420 including the absorbent 416. The fluid inlet 404 is connected to an input fluid handling system (not shown) and the fluid outlet 406 is connected to an output fluid handling system (not shown). The absorbent outlet 410 is connected to a regenerator 422 via a first conduit 424 and the regenerator 422 is connected to the absorbent inlet 408 via a second conduit 426. As the absorbent 416 is circulated from the treating column 402 to the regenerator 422 as shown by the heavy black arrows, the absorbed sulfur-containing components absorbed by the absorbent 416 in the moving absorbent section 420 of the column 402 are desorbed in the regenerator 422. The flow rate of the absorbent, its size and shape, the flow rate of the fluid, the size, temperature and pressure of the treating column and the size, temperature and pressure of the regenerator are adjusted so that a desired reduction in sulfur-containing components can be achieved. The regenerator 422 is connected to a sulfur-containing component collection column 428 via a conduit 430. The apparatus 400 is designed to be operated on a continuous basis with absorbent being added and withdrawn as needed. The moving bed apparatus 400 operates in a manner analogous to the fluid bed apparatus 300.

Figure 15A:
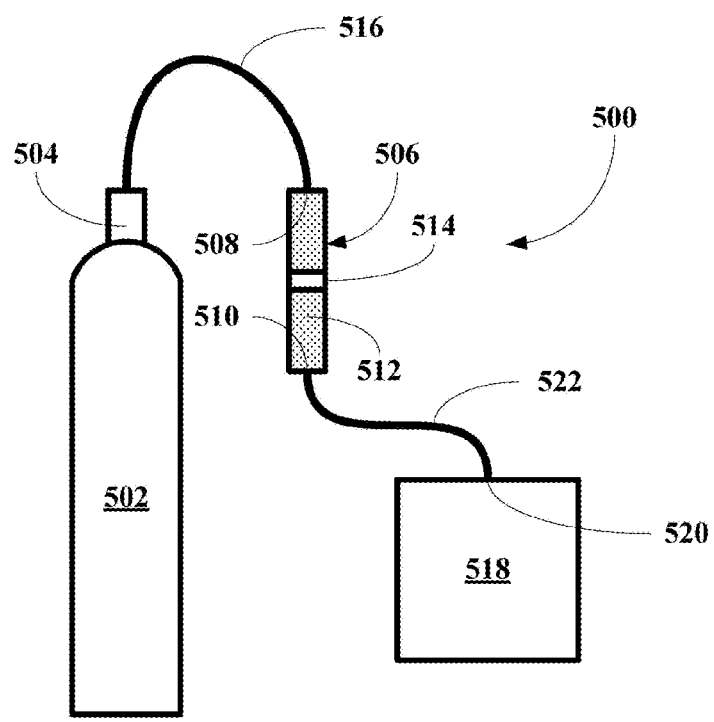
FIG. 15A depicts an embodiment of a gas cartridge for desulfurizing a gas using an absorbent of this invention.

Referring now the FIG. 15A, an embodiment of a gas treating apparatus for reducing sulfur in a gas, generally 500, is shown to include a gas cylinder 502. The cylinder 502 includes a valve 504. The apparatus 500 also includes a cartridge 506 including an inlet 508, an outlet 510, an absorbent 512 and an indicator 514. The cylinder valve 504 is connected to the cartridge inlet 508 via a first conduit 516. The cartridge outlet 510 is connected to a system 518 at an inlet 520 via a second conduit 522, where the system 518 adapted to use the gas after is passes through absorbent 512 in the cartridge 506.

Figure 15B:
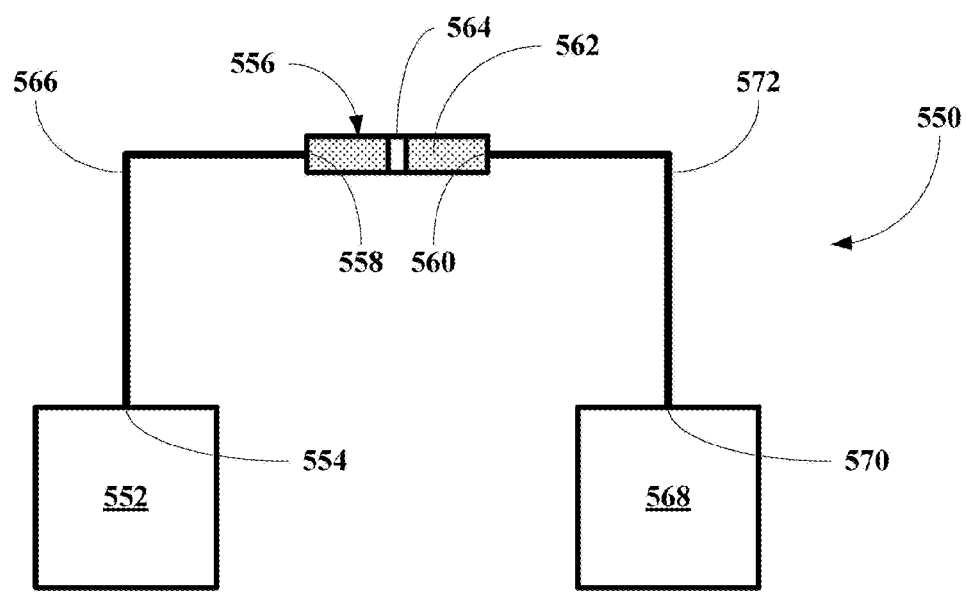
FIG. 15B depicts an embodiment of a fuel cartridge for desulfurizing a fuel using an absorbent of this invention.

Referring now the FIG. 15B, an embodiment of a fuel treating apparatus for reducing sulfur in a fuel, generally 550, is shown to include a fuel reservoir or tank 552. The tank 552 includes an outlet 554. The apparatus 550 also includes a cartridge 556 including an inlet 558, an outlet 560, an absorbent 562 and an indicator 564. The reservoir or tank outlet 554 is connected to the cartridge inlet 558 via a first conduit 566. The cartridge outlet 560 is connected to a fuel consuming system 568 at an inlet 570 via a second conduit 572, where the system 568 adapted to use the fuel after is passes through absorbent 562 in the cartridge 556. The fuel consuming system 568 can be an internal combustion engine, a fuel power generator, or any other system that consumes a fuel that can include various levels of undesirable sulfur-containing components.

REFERENCES CITED IN THE INVENTION

The following references were cited in the application:

1 a) D. W. Breck, *Zeolite Molecular Sieves*, John Wiley & Sons: New York, 1974; b) M. E. Davis, Nature 2002, 417, 813; c) H. van Koningsveld, F. Tuinstra, H. van Bekkum, J. C. Jansen, *Acta Crystallogr.* 1989, B45, 423; d) G. Binder, L. Scandella, J. Kritzenberger, J. Gobrecht, J. H. Koegler, R. J. Prins, *Phys. Chem. B.* 1997, 101, 483; e) E. Y. Choi, Y. Kim, K. J. Seff, *J. Phys. Chem. B.* 2002, 106, 5827; f) C. A. Fyfe, A. C. Diaz, H. Grondey, A. R. Lewis, H. J. Forster, *J. Am. Chem. Soc.* 2005, 127, 7543.

2 M. S. Whittingham, A. J. Jacobson, *Intercalation Chemistry*, Academic Press: New York, 1982.

3 a) C. J. Kepert, M. J. Rosseinsky, *Chem. Commun.* 1999, 375. b) H. Li, M. Eddaoudi, M. O'Keeffe, O. M. Yaghi, *Nature* 1999, 402, 276; c) K. Biradha, M. Fujita, *Angew. Chem.* 2002, 114, 3542; *Angew. Chem., Int. Ed.* 2002, 41, 3392; d) M. P. Suh, J. W. Ko, H. J. Choi, *J. Am. Chem. Soc.* 2002, 124, 10976; e) S. Takamizawa, E. Nakata, H. Yokoyama, K. Mochizuki, W. Mori, *Angew. Chem.* 2003, 115, 4467; *Angew. Chem., Int. Ed.* 2003, 42, 4331; f) B. F. Abrahams, M. Moylan, S. D. Orchard, R. Robson, *Angew. Chem.* 2003, 115, 1892; *Angew. Chem., Int. Ed.* 2003, 42, 1848; g) B. Rather, M. J. Zaworotko, *Chem. Commun.* 2003, 830; h) S. Takamizawa, E. Nakata, T. Saito, *Angew. Chem.* 2004, 116, 1392; *Angew. Chem., Int. Ed.* 2004, 43, 1368; i) S. Kitagawa, R. Kitaura, S, Noro, *Angew. Chem.* 2004, 116, 2388; *Angew. Chem., Int. Ed.* 2004, 43, 2234; j) S. Kitagawa, K. Uemura, *Chem. Soc. Rev.* 2005, 34, 109; k) A. J. Fletcher, E. J. Cussen, D. Bradshaw, M. J. Rosseinsky, K. M. Thomas, *J. Am. Chem. Soc.* 2004, 126, 9750.

4 K. Barthelet, J. Marrot, D. Riou, G. Férey, *Angew. Chem.* 2002, 114, 291; *Angew. Chem., Int. Ed.* 2002, 41, 281.

5 a) F. Millange, C. Serre, G. Férey, *Chem. Commun.* 2002, 822; b) C. Serre, F. Millange, C. Thouvenot, M. Nogues, G. Marsolier, D. Louér, G. Férey, *J. Am. Chem. Soc.* 2002, 124, 13519.

6 T. Loiseau, C. Serre, C. Huguenard, G. Fink, F. Taulelle, M. Henry, T. Bataille, G. Férey, *Chem.-Eur. J.* 2004, 10, 1373.

7 a) T. R. Whitfield, X. Wang, L. Liu, A. J. Jacobson, Solid State Sci. 2004, 7, 1096; b) T. R. Whitfield, X. Wang, A. J. Jacobson, *Mater. Res. Soc. Symp. Proc.* 2003, 755, 191.

8 E. V. Anokhina, M. Vougo-Zanda, X. Wang, A. J. Jacobson, *J. Am. Chem. Soc.* 2005, 127, 15001.

9 a) G. Férey, M. Latroche, C. Serre, F. Millange, T. Loiseau, A. Percheron-Guégan, *Chem. Commun.* 2003, 2976; b) N. L. Rosi, J. Eckert, M. Eddaoudi, D. T. Vodak, J. Kim, M. O'Keeffe, O. M. Yaghi, *Science* 2003, 300, 1127.

10 a) D. N. Dybtsev, H. Chun, S. H. Yoon, D. Kim, K. Kim, *J. Am. Chem. Soc.* 2004, 126, 32; b) A. C. Sudik, A. R. Millward, N. W. Ockwig, A. P. Cöte, J. Kim, O. M. Yaghi, *J. Am. Chem. Soc.* 2005, 127, 7110; c) L. Pan, K. M. Adams, H.; X. Wang, C. Zheng, Y. Hattori, K. Kaneko, *J. Am. Chem. Soc.* 2003, 125, 3062.

11 a) S. Bourrelly, P. L. Llewellyn, C. Serre, F. Millange, T. Loiseau, G. Férey, *J. Am. Chem. Soc.* 2005, 127, 13519; b) K. Seki, *Phys. Chem. Chem. Phys.* 2002, 4, 1968; c) T. Duren, L. Sarkisov, O. M. Yaghi, R. Q. Snurr, *Langmuir* 2004, 20, 2683.

12 U. Mueller, M. Schubert, F. Teich, H. Puetter, K. Schierle-Arndt, J. Pastre *J. Mater. Chem.* 2006, 16, 626.

13 Elemental analysis results for 1: V, 14.8% obs. (14.6% calc.); C, 47.10% obs. (47.08% calc.); H, 2.68% obs. (2.37% calc.). Crystal data for 1: space group $P2_12_12_1$, a=6.8094(3), b=12.4220(6), c=17.1733(8) Å, V=1452.6(1) Å$^3$, Z=4, T=223 K, $d_{calc}$=1.593 g cm$^{-3}$. Single crystal data were collected on a Siemens SMART/CCD diffractometer (14526 reflections total, 3498 unique, $R_{int}$=0.0478). The structure was solved and refined with the SHELXTL software package. Final refinements converged at R1=0.0394 for all 3498 reflections and 188 parameters.

14 Thermogravimetric analyses of 1 carried out in air at 3° C./min showed two weight-loss events. The first between 320 and 400° C. corresponds to the loss of the guest $H_2BDC$. The second between 440 and 480° C. corresponds to the loss of framework BDC. A sample heated at 390° C. for 10 h was confirmed to be identical to MIL-47 by IR (disappearance of the band at ca. 1700 cm$^{-1}$ characteristic of free —C═O species) and single crystal X-ray diffraction (VOBDC, 2: space group Pnma, a=6.8249(8), b=16.073(2), c=13.995(2), T=293 K, $d_{calc}$=1.000 g cm$^{-3}$, R1=0.0443 for all 1904 unique reflections and 67 parameters).

14 After immersing the VOBDC crystals in the corresponding guest liquid in air at room temperature for ca. 1 h, a suitable crystal for each intercalation phase was selected and sealed in a capillary together with the guest liquid in air and mounted on a Siemens SMART/CCD diffractometer for X-ray data collection. Crystal data for 3: space group $P2_12_12_1$, a=6.785(1), b=13.031(2), c=16.851(2) Å, V=1489.8(4) Å$^3$, Z=4, T=223 K, $d_{calc}$=1.445 g cm$^{-3}$. 12940 reflections total, 3511 unique, $R_{int}$=0.0698. R1=0.0394 for all 3511 unique reflections and 180 parameters. Crystal data for 4: space group $P2_12_12_1$, a=6.786(1), b=12.618(2), c=17.086(3) A, V=1463.0(4) Å$^3$, Z=4, T=223 K, $d_{calc}$=1.503 g cm$^{-3}$. 8691 reflections total, 3368 unique, $R_{int}$=0.0641. R1=0.0695 for all 3368 unique reflections and 174 parameters. Crystal data for 5: space group Pnma, a=6.796(3), b=18.410(8), c=10.214(4) Å, V=1278.0(9) Å$^3$, Z=4, T=223 K, $d_{calc}$=1.431 g cm$^{-3}$. 7544 reflections total, 1006 unique, $R_{int}$=0.2022. R1=0.134 for all 1006 unique reflections and 43 parameters. The crystal quality of 5 is comparatively poor probably because of the large unit cell changes during intercalation.

15 C. Janiak, *Dalton Trans.* 2000, 3885.

16 H. Suezawa, T. Yoshida, Y. Umezawa, S. Tsuboyama, M. Nishio, *Eur. J. Inorg. Chem.* 2002, 3148.

17 a) D. R. Allan, S. J. Clark, R. M. Ibberson, S. Parsons, C. R. Pulham, Sawyer, L. *Chem. Commun.* 1999, 751; b) F. H. Allan, C. A. Baalham, J. P. M. Lommerse, P. R. Raithby, *Acta Cryst.* 1998, B54, 320.

18 Barthelet, K.; Marrot, J.; F ey, G.; Riou, D. *VIII(OH){$O_2C$—$C_6H_4$—$CO_2$}. ($HO_2C$—$C_6H_4$—$CO_2H$)$_x$(DMF)$_y$($H_2O$)$_z$ (or MIL-68), a new vanadocarboxylate with a large pore hybrid topology: reticular synthesis with infinite inorganic building blocks?* Chem. Commun. 2004, 520-521.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An adsorbed composition comprising:
at least one compound of a class of porous metal organic compounds of the general formula MOADA and a fluid containing the at least one sulfur-containing component, where the at least one sulfur-containing component is adsorbed into pores of the at least one compound to form a desulfurized fluid, where M is a tetravalent metal or a mixture of tetravalent metals, O is an oxygen atom, and ADA is a dianion of a dicarboxylic acid ($H_2ADA$), where the at least one sulfur-containing component is reversibly adsorbed in the pores of the at least one compound.

2. The composition of claim 1, wherein the fluid is a gas, a liquid or a mixture thereof.

3. The composition of claim 1, wherein the fluid is a hydrocarbon fluid.

4. The composition of claim 1, wherein the at least one compound adsorbs the at least one sulfur-containing component in the fluid at a total pressure of 1 atmosphere at ambient temperature.

5. The composition of claim 1, wherein the hydrocarbon fluid is a fuel.

6. The composition of claim 1, wherein the fluid is selected from the group consisting of water, chemical gases and/or liquids, hydrocarbon gases and/or liquids, biological gases and/or liquids, biochemical gases and/or liquids, and mixtures or combinations thereof.

7. The composition of claim 1, wherein the metal atom is selected from the group consisting of aluminum (Al), vanadium (V), chromium (Cr), iron (Fe), titanium (Ti), zirconium (Zr), hafnium (Hf), cerium (Ce), and mixtures thereof.

8. The composition of claim 7, wherein the metal atom is V is vanadium.

9. The composition of claim 1, wherein the dicarboxylic acid dianion is selected from the group consisting of aryl dicarboxylic acids, alkaryl dicarboxylic acids and mixtures thereof.

10. The composition of claim 9, wherein the dicarboxylic acid dianion is selected from the group consisting of 1,4-benzene dicarboxylic acid (terephthalic acid), 1,3-benzene dicarboxylic acid (isophthalic acid), 4,4'-diphenyl dicarboxylic acid, 2,5-pyridine dicarboxylic acid, 1,4-naphthylene dicarboxylic acid, 1,5-naphthylene dicarboxylic acid, and mixtures thereof.

11. The composition of claim 1, wherein the dicarboxylic acid dianion is the dianion of benzene dicarboxylic acid ($H_2BDC$).

12. The composition of claim 1, wherein the metal atom is V is vanadium and the dicarboxylic acid dianion is the dianion of benzene dicarboxylic acid ($H_2BDC$).

* * * * *